United States Patent
Zwegers

(10) Patent No.: US 10,119,985 B2
(45) Date of Patent: Nov. 6, 2018

(54) MULTI-FUNCTION SPEED SENSOR

(71) Applicant: AISIN TECHNICAL CENTER OF AMERICA, INC., Northville, MI (US)

(72) Inventor: Corey Zwegers, Northville, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 1 day.

(21) Appl. No.: 14/920,404

(22) Filed: Oct. 22, 2015

(65) Prior Publication Data

US 2017/0113698 A1 Apr. 27, 2017

(51) Int. Cl.
*G01M 17/00* (2006.01)
*G06F 7/00* (2006.01)
*G06F 19/00* (2018.01)
*G01P 3/488* (2006.01)
*G01P 3/486* (2006.01)

(52) U.S. Cl.
CPC .............. *G01P 3/488* (2013.01); *G01P 3/486* (2013.01); *H05K 999/99* (2013.01)

(58) Field of Classification Search
USPC ........................................................ 701/34.4
See application file for complete search history.

(56) References Cited

U.S. PATENT DOCUMENTS

| | | | |
|---|---|---|---|
| 3,743,934 A * | 7/1973 | Risch .................... | G01R 31/343 324/224 |
| 3,937,994 A * | 2/1976 | Presley .................... | G01P 3/488 310/155 |
| 5,141,090 A * | 8/1992 | Trojan ...................... | F16D 1/12 192/110 R |
| 5,703,424 A * | 12/1997 | Dorman .............. | F16C 32/0451 310/90.5 |
| 5,726,886 A * | 3/1998 | Yamakado ....... | B60G 17/01908 701/93 |
| 5,818,137 A * | 10/1998 | Nichols ............... | F16C 32/0448 310/90.5 |
| 6,149,506 A * | 11/2000 | Duescher .................. | B24B 1/00 451/178 |
| 6,249,067 B1 * | 6/2001 | Schob ................. | F16C 32/0446 310/68 B |
| 6,879,145 B1 * | 4/2005 | Harris ...................... | G01D 3/08 324/117 H |

(Continued)

FOREIGN PATENT DOCUMENTS

SU 1504489 A * 8/1989

OTHER PUBLICATIONS

J. P. Carmo, et al., "On-chip CMOS Wireless Sensors Interface for Automotive Applications", Proc. Eurosensors XVIII, Sep. 12-15, 2004, pp. 387-388.

*Primary Examiner* — Jean Paul Cass
(74) *Attorney, Agent, or Firm* — Oblon, McClelland, Maier & Neustadt, L.L.P.

(57) ABSTRACT

A smart sensor system and method for a vehicle are described. The smart sensor includes at least one sensing element installed on a suspension of the vehicle and coupled with a wheel of the vehicle, and a digital signal processing circuitry configured to receive signal from the at least one sensing element in the form of a digital signal, correlate the digital signal to an air gap data, and determine a vehicle speed, a vehicle acceleration, a suspension condition, a tire condition, a brake condition, a wheel condition, and a road condition.

10 Claims, 27 Drawing Sheets

(56) References Cited

U.S. PATENT DOCUMENTS

| | | | |
|---|---|---|---|
| 7,103,460 B1* | 9/2006 | Breed | B60C 23/0408 701/29.1 |
| 7,323,843 B2* | 1/2008 | Tu | H02K 15/16 318/490 |
| 8,604,807 B2* | 12/2013 | Lehmann | B61H 7/08 104/26.2 |
| 8,868,290 B2 | 10/2014 | Hammerschmidt | |
| 8,942,861 B2 | 1/2015 | Wakao | |
| 9,190,881 B1* | 11/2015 | Jahani | H02K 7/06 |
| 9,500,465 B2* | 11/2016 | Rolew | G01B 7/14 |
| 2005/0150304 A1* | 7/2005 | Gustafson | G01L 9/0089 73/754 |
| 2005/0192727 A1* | 9/2005 | Shostak | B60C 11/24 701/37 |
| 2005/0273218 A1* | 12/2005 | Breed | B60C 11/24 701/2 |
| 2007/0255467 A1* | 11/2007 | Blanchin | B60C 23/061 701/38 |
| 2008/0040021 A1* | 2/2008 | Staniewicz | F01L 1/34 701/115 |
| 2008/0114523 A1* | 5/2008 | Dugas | B60L 7/16 701/101 |
| 2008/0211434 A1* | 9/2008 | Daum | B60L 3/102 318/52 |
| 2008/0257311 A1* | 10/2008 | Spicer | F01L 1/34 123/481 |
| 2009/0256552 A1* | 10/2009 | Guo | G01B 7/30 324/207.21 |
| 2009/0295380 A1* | 12/2009 | Motz | G01R 33/072 324/251 |
| 2009/0315543 A1* | 12/2009 | Guo | G01D 5/145 324/207.21 |
| 2010/0218588 A1* | 9/2010 | Staniewicz | G01D 5/2449 73/1.75 |
| 2010/0326760 A1* | 12/2010 | Dugas | B60L 7/16 180/335 |
| 2012/0111137 A1* | 5/2012 | Bliss | B60K 26/02 74/504 |
| 2012/0119628 A1* | 5/2012 | Schwery | H02K 11/20 310/68 B |
| 2012/0138375 A1* | 6/2012 | Hughes | B60L 7/10 180/65.1 |
| 2012/0313374 A1* | 12/2012 | Laurberg | F03D 7/00 290/44 |
| 2013/0035834 A1* | 2/2013 | Couch | B60C 23/20 701/70 |
| 2013/0311020 A1* | 11/2013 | Searles | B62M 6/50 701/22 |
| 2014/0132254 A1* | 5/2014 | Thomas | G01R 1/44 324/225 |
| 2014/0352462 A1* | 12/2014 | Wood | F03G 3/08 74/5.7 |
| 2015/0142356 A1* | 5/2015 | Thomas | G01D 3/0365 702/65 |
| 2015/0293177 A1* | 10/2015 | Ottewill | G01R 31/343 702/58 |
| 2015/0331005 A1* | 11/2015 | Dalisdas | G01P 1/00 701/72 |
| 2017/0097230 A1* | 4/2017 | Rogers | B60R 11/04 |

* cited by examiner

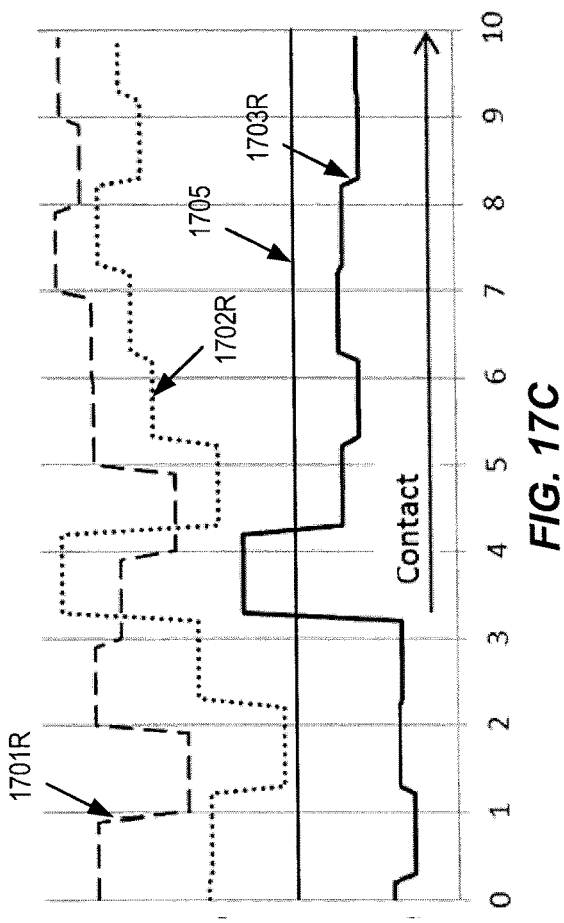
FIG. 17B
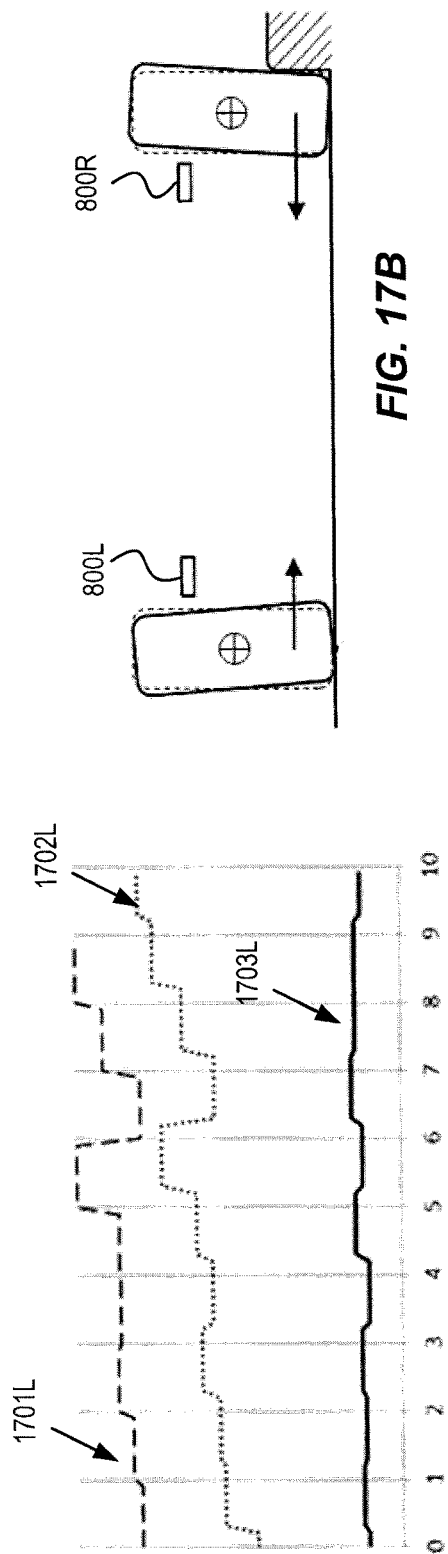
FIG. 17C
FIG. 17A

| Parameters | | Single-channel | | |
|---|---|---|---|---|
| | | Standard pulse output | Air gap (AGC state) | Air gap (DIFF Amp.) |
| General | Speed | Yes | Yes | Yes |
| | Direction | No | No | No |
| Road | Air gap | No | Yes | Yes |
| | Crown | No | Maybe | Yes |
| | Roughness | No | Yes | Yes |
| | Friction | No | Maybe | Yes |
| Tire | Pressure | Yes | Yes | Yes |
| | Balance | No | No | No |
| | Concentricity | No | No | No |
| Wheel | Wobble | No | No | No |
| Brake | Warp | No | No | No |
| Suspension | Damper condition | Yes | Yes | Yes |
| Dynamic | Cornering Force | No | Maybe | Maybe |

*FIG. 21A*

| Parameters | | Standard pulse output | Two-channel | |
|---|---|---|---|---|
| | | | Air gap (DIFF Amp) Air gap change | Air gap (DIFF Amp) Air gap change Air gap freq. analysis |
| General | Speed | Yes | Yes | Yes |
| | Direction | Yes | Yes | Yes |
| Road | Air gap | No | Yes | Yes |
| | Crown | No | Yes | Yes |
| | Roughness | No | Yes | Yes |
| | Friction | No | Yes | Yes |
| Tire | Pressure | Yes | Yes | Yes |
| | Balance | No | No | Yes |
| | Concentricity | No | No | Yes |
| Wheel | Wobble | No | No | Yes |
| Brake | Warp | No | Yes | Yes |
| Suspension | Damper condition | Yes | Yes | Yes |

FIG. 21B

MULTI-FUNCTION SPEED SENSOR

BACKGROUND

Field of the Disclosure

This application relates generally to improvements to a speed sensor. More particularly the present disclosure relates to improvement in functions performed by the speed sensor employing a magnet separated from a vehicle component by an air gap.

Description of the Related Art

Speed sensor and accelerometers are commonly used in an automobile for controlling vehicle systems such as antilock braking system, detecting and monitoring vibrations, stabilization etc. The sensors send signals to an electronic control unit (ECU), where the controlling action can be determined. Further, for increasing the stability of a vehicle, it is desired that the road surface condition, or tire condition be estimated with accuracy in real-time. The estimated road condition or tire condition is then fed back to electronic control unit to determine the optimum control action. For example, if the road surface condition is slippery then it may be necessary to operate the advanced control such as ABS (antilock braking system) braking before taking any sudden avoidance action.

The road condition and vehicle condition data can also be used for scheduling vehicle maintenance, replacing faulty parts, alerting the driver of critical condition such as brake wobble or slippery road condition, etc. Typically, several sensors are required to determine the road and vehicle conditions which can significantly increase the manufacturing and maintenance cost of the vehicle. For a low cost system, smart sensors which can perform several of the ECU functions are needed.

Road conditions can be determined in several ways using one or more sensors, and by processing the sensor signals. In U.S. Pat. No. 8,942,861 B2, a multi-sensor system having a wheel speed sensor, an accelerometer and ECU are used to determine road surface condition resulting in high system cost. The road surface condition is correlated to the speed, speed variation, acceleration and acceleration variation.

In U.S. Pat. No. 8,868,290 B2, a tire pressure monitoring system is disclosed that considers only resonant frequencies and specifically monitors tire pressure. Further, only resonant frequencies are communicated with the vehicle so the manufacturer must spend extra resources to develop logic for determining tire pressure and road conditions.

There remains a continuing need to provide an improved smart sensor which can combine multiple functions into a single speed sensor to determine tire pressure, tire concentricity, tire balance, tire flat detection, suspension damper condition, brake condition, road condition, etc. Further, the smart sensor should have an increased accuracy and reliability of tire, suspension and road condition judgment. The smart sensor should capture high frequency road inputs to wheel/suspension system that are often overlooked. Furthermore, there is a need to minimize the number of sensors by combining several functionalities into one smart sensor. For example, speed sensor that eliminates the need for an accelerometer thus reducing the system cost.

SUMMARY

According to an embodiment of the present disclosure, there is provided a smart sensor. The smart sensor for a vehicle includes at least one sensing element installed on a suspension of the vehicle and coupled with a wheel of the vehicle, and a digital signal processing circuitry configured to receive signal from the at least one sensing element in the form of a digital signal, correlate the digital signal to an air gap data, and determine a vehicle speed, a vehicle acceleration, a suspension condition, a tire condition, a brake condition, a wheel condition, and a road condition.

Further, according to an embodiment of the present disclosure, there is provided a method for determining vehicle condition and road condition based on an air gap data. The method including correlating a signal from at least one sensing element to an air gap, detecting a plurality of abnormal conditions based on the air gap amplitude analysis, and detecting a plurality of abnormal conditions based on the air gap frequency analysis.

Further, according to an embodiment of the present disclosure, there is provided a non-transitory computer-readable medium which stores a program which, when executed by a computer, causes the computer to perform the method for determining vehicle condition and road condition based on an air gap data.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 17A illustrates an air gap change of a left wheel when a vehicle experiences a curb contact according to an embodiment of the present disclosure.

FIG. 17B is a sample configuration of two smart sensor coupled with a left wheel and a right wheel of the vehicle according to an embodiment of the present disclosure.

FIG. 17C illustrate an air gap change of a right wheel when a vehicle experiences a curb contact according to an embodiment of the present disclosure.

FIG. 21A is table showing capabilities of a single-channel smart sensor according to an embodiment of the present disclosure.

FIG. 21B is table showing capabilities of a two-channel smart sensor respectively, according to an embodiment of the present disclosure.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, and any values therebetween.

Figure 1:
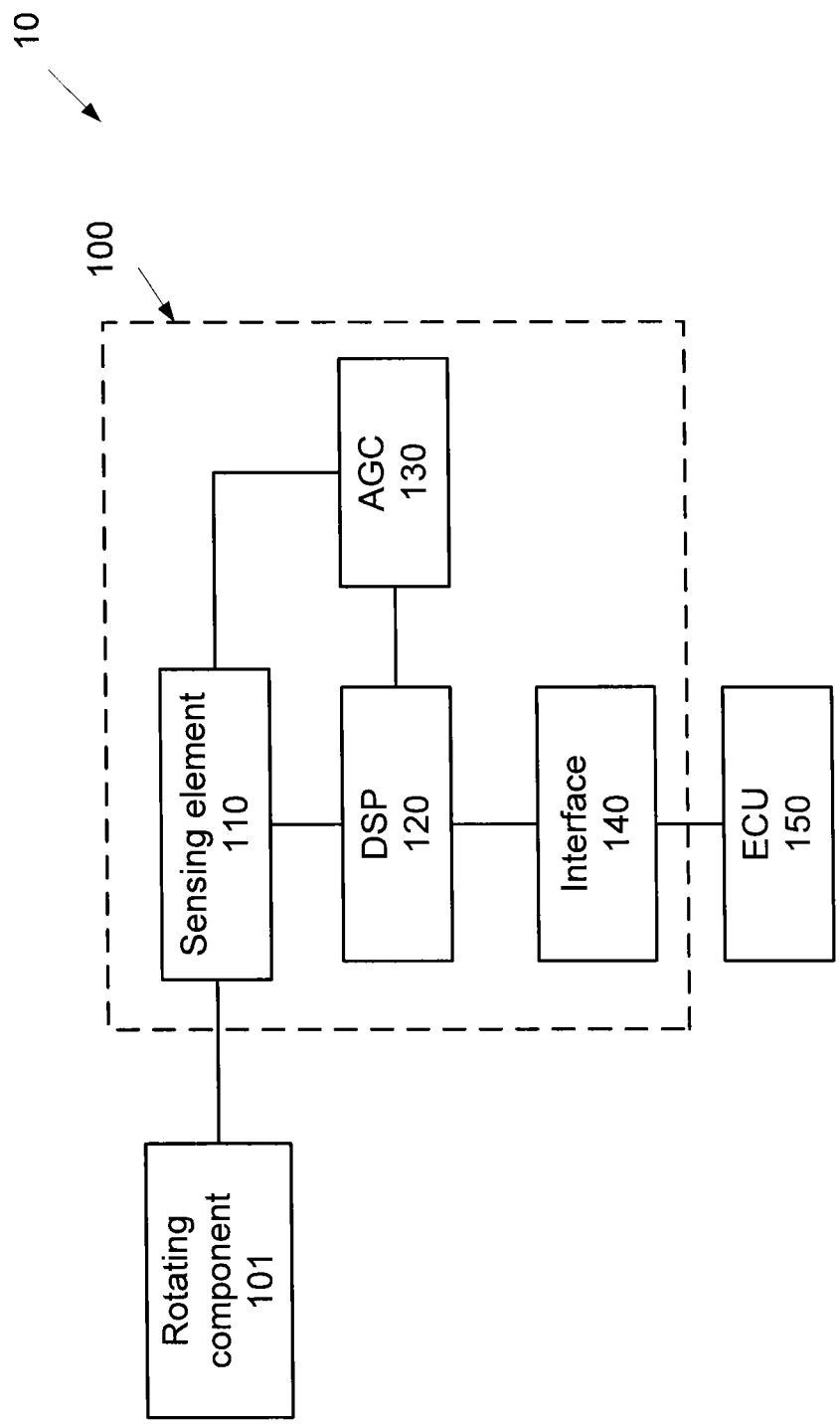
FIG. 1 is a block diagram of a smart sensor system used in a vehicle according to an embodiment of the present disclosure.

FIG. 1 is a block diagram of a smart sensor system used in a vehicle according to an embodiment of the present disclosure. A smart sensor system 10 includes a rotating component 101, a sensing element 110, a digital signal processing circuitry (referred as DSP hereafter) DSP 120, an automatic gain controller (referred as AGC hereafter) AGC 130, and interface 140. The sensing element 110 is placed next to a rotating component 101 such that an air gap is maintained between the sensing element 110 and the rotating component 101. Optionally, the smart sensor system 10 can include an electronic control unit (ECU hereafter) ECU 150 that receives the smart sensor 100 data.

The rotating component 101 can be a wheel of a vehicle, a rotating disc, a shaft of a motor, etc. The rotating component 101 can be embedded with a sensor element complementary to the sensing element 110 such as a magnet complements a magnetic sensor or a slotted disc complements an optical sensor.

The sensing element 110 is an element that responds to an air gap change. For instance, an optical sensor or a magnetic sensor. Several magnetic sensors such as a single magneto-resistance type sensor, a single Hall Effect sensor, or a differential magnetic sensor react to an air gap change. As the air gap increases the magnetic field strength decreases and as the air gap decreases the magnetic field strength increases. The air gap to magnetic field relationship can be exponential in nature depending on the dynamics of the system. The sensing element 110 can send the signal to a processing circuitry for further signal modification and analysis. In embodiments of the present disclosure, a differential magnetic sensor is used as an example to discuss various features of the smart sensor system 10.

The DSP 120 is a circuitry that can receive and process a signal from the smart sensor 100. The functions of DSP 120 include but not limited to: a) an air gap determination based on an amplitude gain; b) an air gap determination based on an amplitude of the differential magnetic sensor; c) an air gap change based on a differential (hereafter DIFF) amplitude; d) an air gap frequency analysis; e) an air gap analysis using a discrete Fourier transform; and f) diagnosis of vehicle dynamics, road conditions, tire conditions, wheel conditions, brake conditions, and suspension conditions.

For example, the DSP 120 can analyze a signal amplitude or a signal frequency to detect an anomaly, which can be further used to diagnose a problem such a flat tire, a wobbly brake, a bumpy road condition, or a suspension issue. For instance, a bump in a road may cause a sudden spike or a dip in the signal. A detailed discussion of the DSP 120 circuitry follows later in the present disclosure.

The AGC 130 is a circuitry that receives the signal send by the sensing element 110 and controls an amplifier gain. The amplifier gain increases, decreases or maintains the signal amplitude such that the signal amplitude is in a desired range of operation. The amount of gain control can be predetermined experimentally or determined theoretically based on dynamics of the system under consideration, such as a wheel-suspension system. A detailed discussion of the AGC 130 circuitry follows later in the present disclosure.

The interface 140 is a circuitry that transfers data from a smart sensor 100 to a processor such as the ECU 150 of a vehicle while following a specific communication protocol. Optionally, the interface 140 can provide amplification, calibration and temperature compensation. For example, a peripheral sensor interface-5 (PSI5) is a two-wire interface, used to connect peripheral sensors to electronic control units in automotive electronics. PSI5 can support point-to-point and bus configurations with asynchronous and synchronous data transmission. A synchronous serial interface (SSI) base on RS-422 standards is a synchronous, point-to-point serial communication channel for digital data transmission. Alternatively, a CMOS interface for short-range wireless sensor networks can be used.

According to an embodiment of the present disclosure, the sensing element 110, the DSP 120, the AGC 130, and the interface 140 can be configured to form a monolithic sensor such as the smart sensor 100. However, the smart sensor 100 is not limited to above configuration and a distributed configuration is possible. For instance, the DSP 120 can be a part of a separate electronic control unit, which can receive data from the sensing element 110.

The ECU 150 can be an electronic control unit installed on a vehicle. The ECU 150 can communicate with the smart sensor 100 via the interface 140. The ECU 150 can perform several functions such as an actuator control related to an engine, interpreting engine related data to determine the state of the engine, etc. The ECU 150 can be programmed to use information from the smart sensor 100 to further perform detection, diagnosis and prognosis of a part or an entire vehicle.

Figure 2:
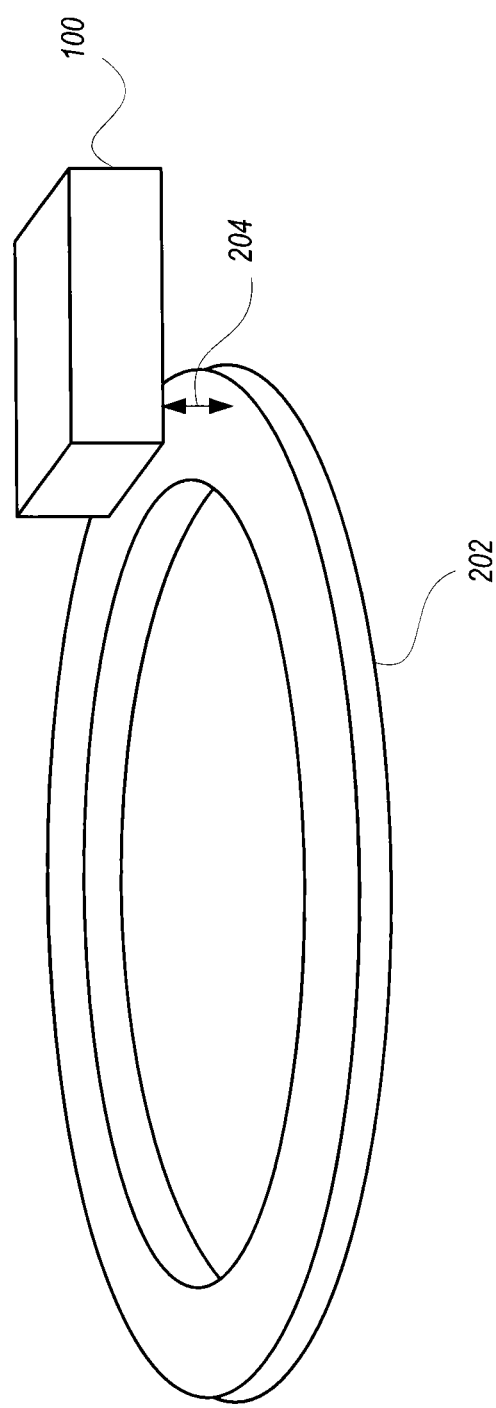
FIG. 2 illustrates a smart sensor according to an embodiment of the present disclosure.

FIG. 2 illustrates a smart sensor facing a rotating wheel according to an embodiment of the present disclosure. A wheel 202 represents the rotating component 101 which is coupled with the smart sensor 100. The smart sensor 100 can be placed on a vehicle component close to the wheel 202 such as a suspension component (not shown). The smart sensor 100 can be placed over the wheel 202 separated by an air gap 204. As the wheel 202 rotates, the smart sensor 100 reads a magnetic signal, whose amplitude is inversely proportional to the air gap 204. The air gap 204 can be measured as a distance between the wheel 202 and the smart sensor 100. The distance varies as the wheel 202 or the smart sensor 100 is displaced with respect to each other causing a change in the magnetic field strength. For example, when the smart sensor 100 moves downwards, the air gap 204 decreases causing the magnetic field strength to increase. The air gap 204 can change due to various reasons, for example, if a target is coupled to a wheel hub and the smart sensor 100 is attached to a suspension, the air gap 204 can change as the suspension flexes due to forces exerted on the wheel or a vehicle body.

Figure 3:
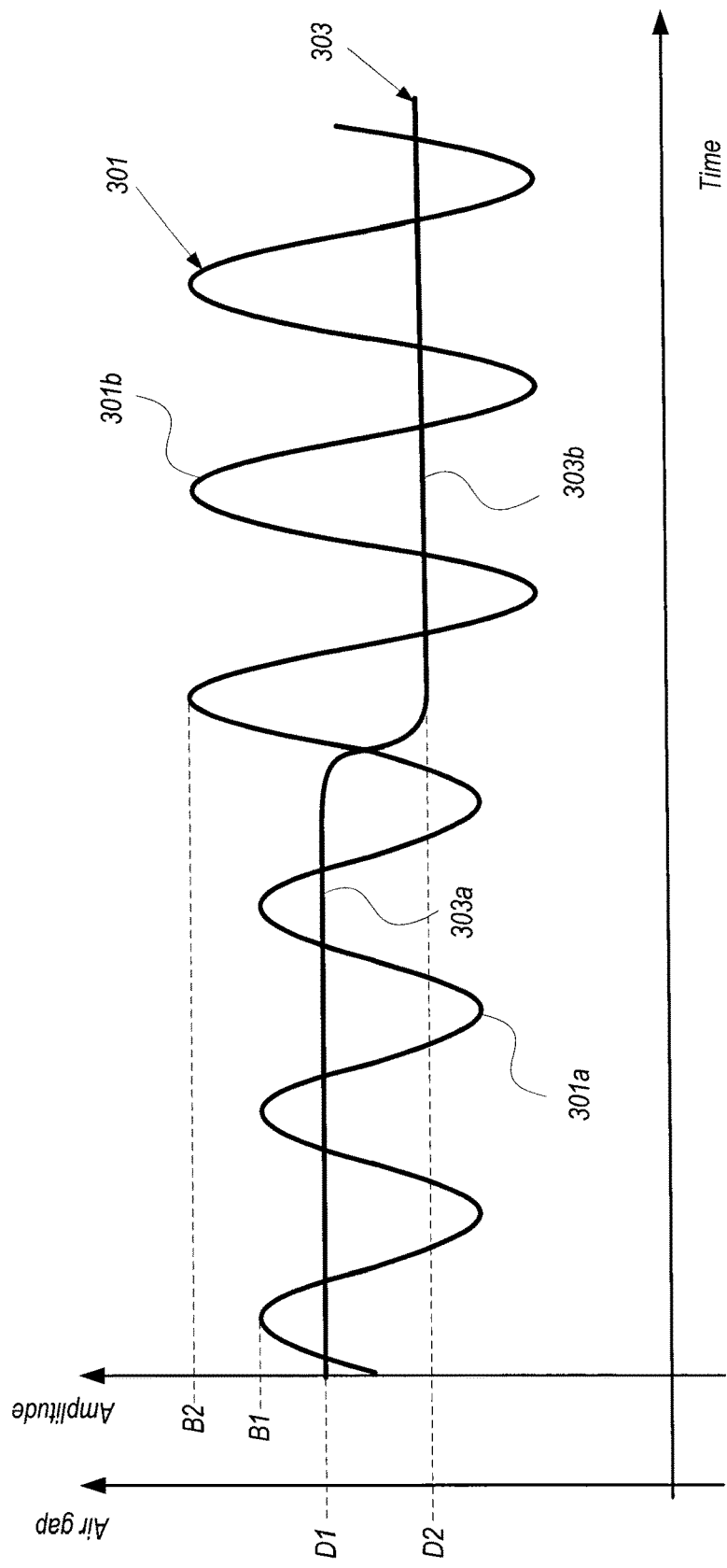
FIG. 3 illustrates the effect of change in air gap on the magnetic signal according to an embodiment of the present disclosure.

FIG. 3 illustrates the effect of an air gap change on the magnetic signal according to an embodiment of the present disclosure. Typically, a signal represents a parameter being measured and can be a complex function of one or more variables. A signal can be characterized by amplitude and a frequency. The amplitude and the frequency can change over a period of time depending on the complex function and changes in one or more variables. In FIG. 3, a magnetic signal 301 can represent strength of a magnetic field such as B-field. The magnetic signal 301 can be a complex valued function of a variable such as the air gap 204, and the magnetic signal 301 can be characterized by a magnitude B (referred as amplitude B hereafter), as illustrated. The air gap 204 can be monitored continuously over a period of time and represented as an air gap signal 303. The air gap signal 303 captures the distance between the rotating component 101 and the smart sensor 100 over a period of time. Further, the graph indicates the relationship between the magnetic signal 301 and the wheel 202. When a first air gap 303a is at a distance D1, then the first magnetic signal 301a has amplitude B1. When a second air gap 303b decreases to a distance D2, the second magnetic signal 301b has amplitude B2, which is larger than the amplitude B1 of the first magnetic signal 301a.

Figure 4:
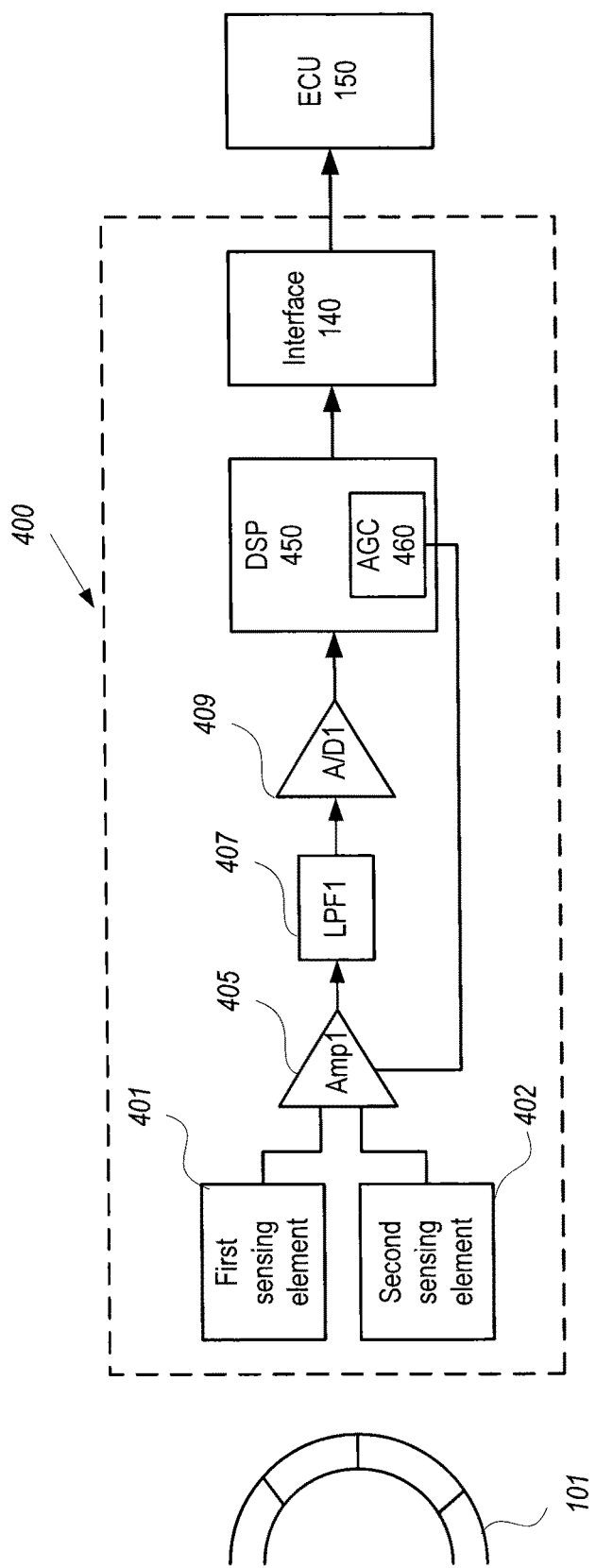
FIG. 4 illustrates a smart sensor employing a single channel differential magnetic sense element according to an embodiment of the present disclosure.

FIG. 4 illustrates a smart sensor employing a single-channel differential magnetic sense element according to an embodiment of the present disclosure. A single-channel smart sensor 400 is an example of the smart sensor 100 (shown in FIG. 1). The single-channel smart sensor 400 employs two magnetic sensing elements, one amplifier, one low pass filter (referred as LPF hereafter), and one analog-to-digital converter (referred as A/D hereafter). Referring to FIG. 4, the single-channel smart sensor 400 is coupled to the rotating component 101 and the ECU 150. The single-channel smart sensor 400 includes a first sensing element 401, a second sensing element 402, a first amplifier 405 (Amp1 in FIG. 4), a first LPF 407 (LPF1 in FIG. 4), a first A/D 409 (A/D1 in FIG. 4), a single-channel DSP 450, a single-channel AGC 460, and the interface 140. The first sensing element 401, the second sensing element 402 and the signal processing circuitry including the first amplifier 405, the first LPF 407, and the first A/D 409 can be integrated on one silicon substrate (or any other substrates such as glass, plastic etc.) using various microfabrication techniques. Optionally, other signal processing circuitry components including the single-channel DSP 450, the single-channel AGC 460, and the interface 140 can also be integrated on the same silicon substrate to form the single-channel smart sensor 400. For example, a BiCMOS fabrication process can be used to integrate different components on a single substrate.

The first sensing element 401 and the second sensing element 402 sense the magnetic signals created by the rotating component 101 and send the magnetic signals to the first amplifier 405. The first amplifier 405 is an amplifier which controls the power of a signal while preserving the shape of an input signal. The output magnitude depends on an input to output ratio called a gain of an amplifier. For instance, when the input is a differential magnetic signal from the first sensing element 401 and second sensing element 402, then the first amplifier 405 controls a signal amplitude B based on the gain G1 of the first amplifier 405. The gain G1 of the first amplifier 405 can be controlled by the single-channel AGC 460. The single-channel AGC 460 contains predetermined gain states, which can be determined experimentally or theoretically. The single-channel AGC 460 gain states are discussed in detail with respect FIG. 5 by way of an example.

The output signal from the first amplifier 405 can be passed through a filter to remove any unwanted signal components or features. The filter can suppress some aspects of a signal. For instance, the output from the first amplifier 405 can be passed through the first LPF 407, which passes only the signals with frequencies lower than a cut-frequency and attenuates signals with frequencies higher than the cut-off frequency. The cut-off frequency can be calculated in several ways. For example, for a resistance-capacitance RC-type filter, the cut-off frequency ($f_c$) can be calculated as $f_c=1/(2\pi RC)$, where R is a resistance value and C is a capacitance value of the filter circuit. Typically, a filter is provided for conditioning a signal prior to A/D conversion. The first LPF 407 filters magnetic signals with frequencies lower than the cut-off frequency and passes a filtered signal to the first A/D 409.

The first A/D 409 converts an analog signal to a digital signal which can be further processed by a digital circuitry such as the single-channel DSP 450 or the single-channel AGC 460. The single-channel DSP 450 can perform several functions as discussed with respect to the DSP 120. Example functions performed by the single-channel DSP 450 are discussed in detail with respect to FIGS. 6-8.

Figure 5:
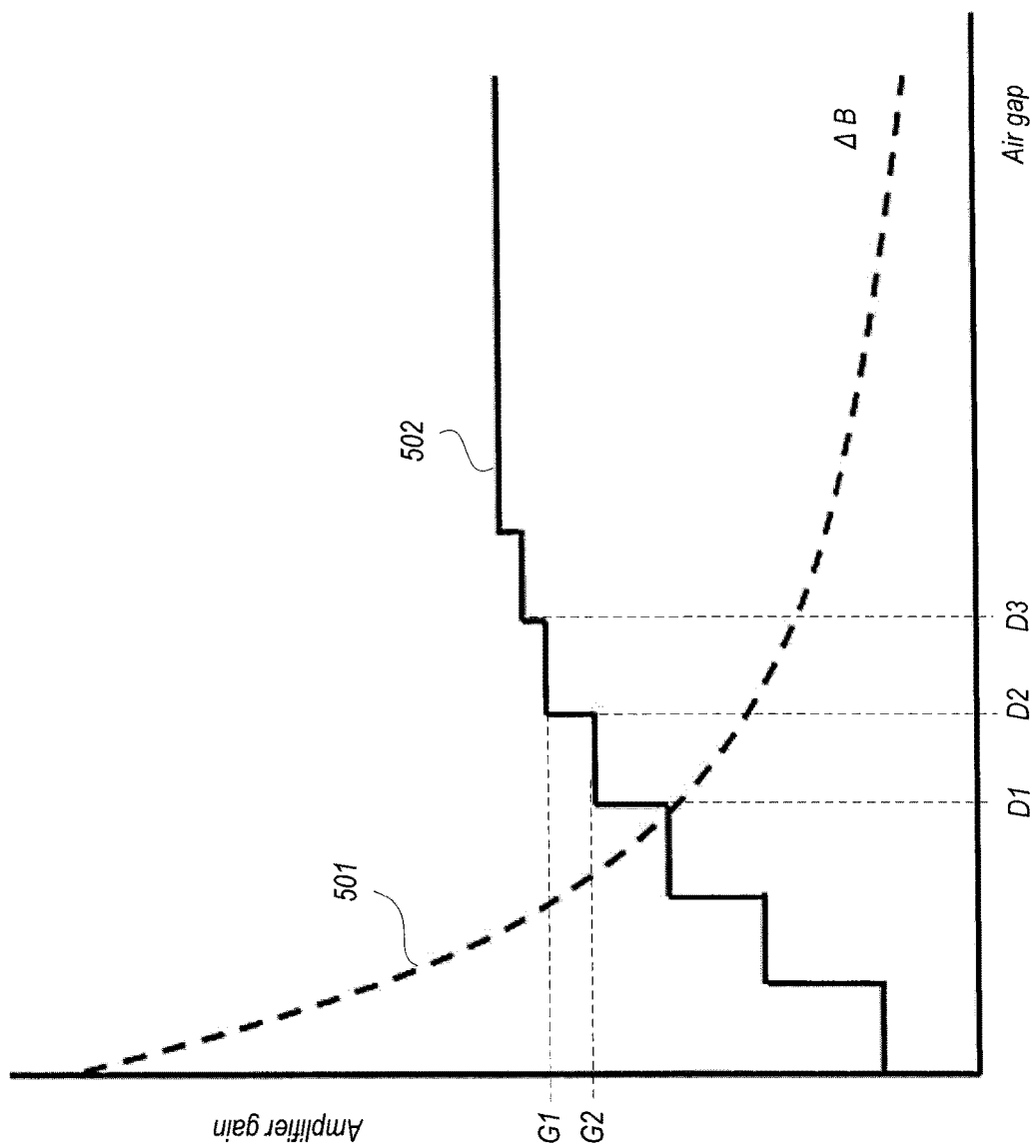
FIG. 5 illustrates a sample gain control function implemented in an AGC according to an embodiment of the present disclosure.

FIG. 5 illustrates a sample gain control function implemented in an AGC according to an embodiment of the present disclosure. The graph illustrates that an air gap is inversely proportional to magnetic signal strength ($\Delta B$) 501. As the air gap 204 (in FIG. 1) increases, the magnetic signal strength ($\Delta B$) 501 decreases. A decrease in the magnetic signal strength ($\Delta B$) 501 implies the amplitude B of magnetic signal (for example magnetic signal 301 in FIG. 3) decreases and vice-versa. The graph also indicates a relationship between the air gap 204 and an AGC gain states 502. The AGC gain states 502 can be a set of discrete amplitude gain values, each discrete value may correspond to a range of the air gap 204. Further, the number of AGC gain states 502 can vary. For example, the number of AGC gain states 502 can be 20. An amplifier gain state G1 indicates that the air gap 204 can be within a range from D1 to D2, while an amplifier gain state G2 indicates that the 204 can be within a range from D2 to D3. Furthermore, the graph shows that as the air gap 204 increases, the amplitude of the gain state increases. The relationship between the air gap 204 and the AGC gain states 502 can be determined by calibration on a rotational sensor test fixture with adjustable air gap. During the calibration process, a resolution of the air gap 204 can be directly proportional to the maximum signal hysteresis, calculated as difference between the maximum signal strength $B_{max}$ and minimum signal strength $B_{min}$. As such, when the air gap 204 increases, the magnetic signal strength ($\Delta B$) 501 decreases and the AGC gain states 502 increases to amplify the weak magnetic signal strength ($\Delta B$) 501. On the other hand, when the air gap 204 decreases, the magnetic signal strength ($\Delta B$) 501 increases and the AGC gain states 502 decreases to reduce the amplitude of the strong magnetic signal strength ($\Delta B$) 501.

Figure 6A:
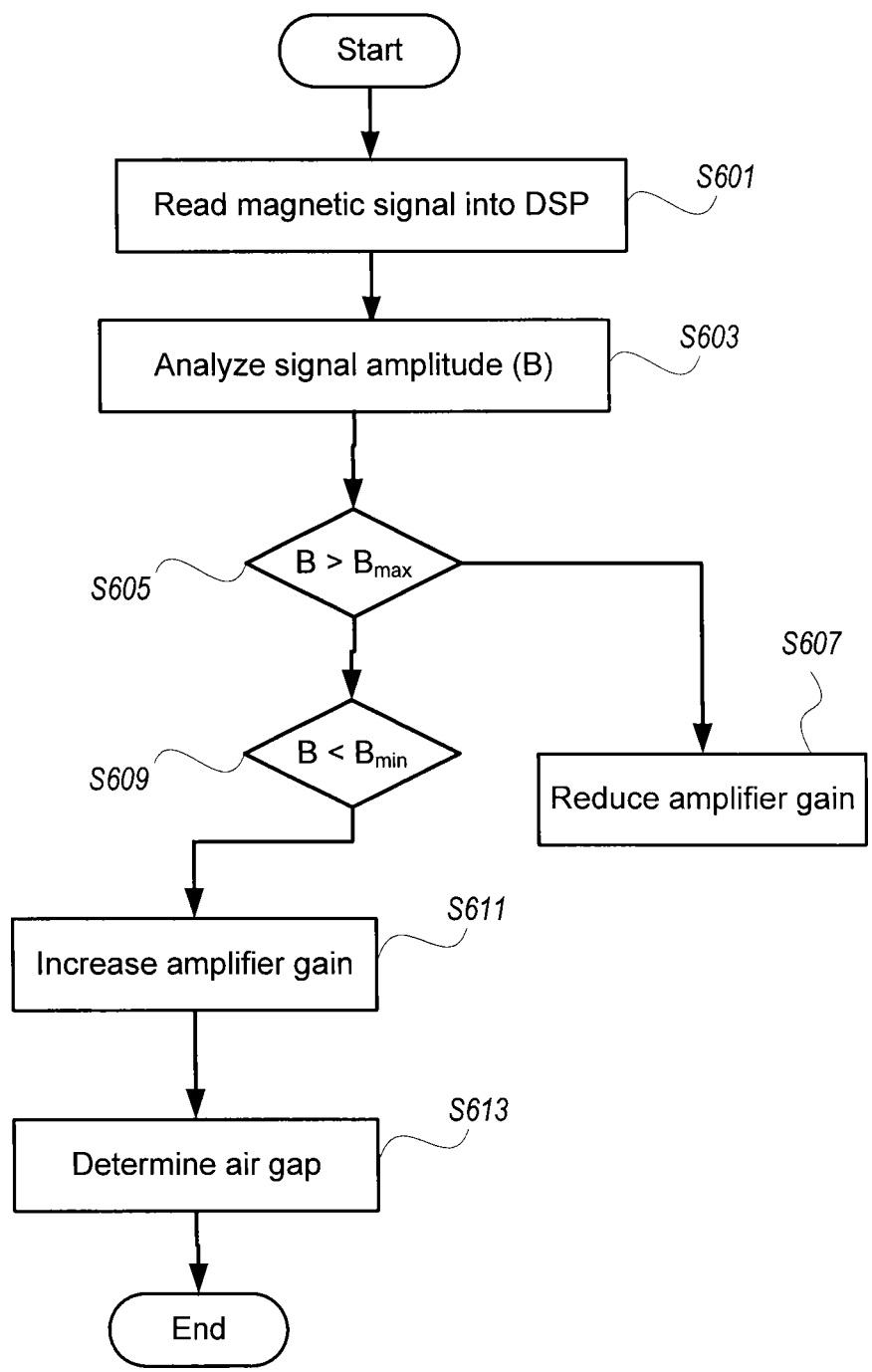
FIG. 6A is a flow chart of air gap performed using a DSP and an AGC based on a magnetic signal according to an embodiment of the present disclosure.

FIG. 6A is a flow chart of air gap performed using a DSP and an AGC based on a magnetic signal according to an embodiment of the present disclosure. The process starts when the sensing element reads the magnetic signal and passes through a signal conditioning circuitry to transform the magnetic signal from an analog form to a digital form. Further, the amplifier gain to air gap relationship can be pre-calibrated, as discussed with respect to FIG. 5. In step 601, the single-channel DSP 450 (in FIG. 4) reads the magnetic signal for processing, for instance, determining the amplitude and the frequency of the magnetic signal. In step 603, the amplitude B of the signal is analyzed. For example, the amplitude B of the signal is compared with the minimum and maximum threshold limits such as $B_{min}$ and $B_{max}$. In step 605, the single-channel DSP 450 determines whether the amplitude B of the magnetic signal is greater than the maximum threshold $B_{max}$. If so, the single-channel AGC 460 reduces the amplitude gain G1 of the first amplifier 405 to attenuate the amplitude B of the magnetic signal, in step 607.

If the amplitude B of the magnetic signal is less than or equal to the maximum threshold then a determination can be made if amplitude B of the magnetic signal is below the minimum threshold $B_{min}$, in step 609. If so, the single-channel AGC 460 increases the amplifier gain G1 of the first amplifier 405 to magnify the amplitude B of the magnetic signal, in step 611. If amplitude B of the magnetic signal is above the minimum threshold $B_{min}$ and below the maximum threshold $B_{max}$, amplification or attenuation is not performed.

In step 613, an air gap corresponding to the amplifier gain G1 is determined, based on the predetermined relationship between the amplitude gain state and the air gap, for example FIG. 5. The above process continues till the sensing element reads a magnetic signal. A signal processing based on above process is discussed with respect to FIG. 6B.

Figure 6B:
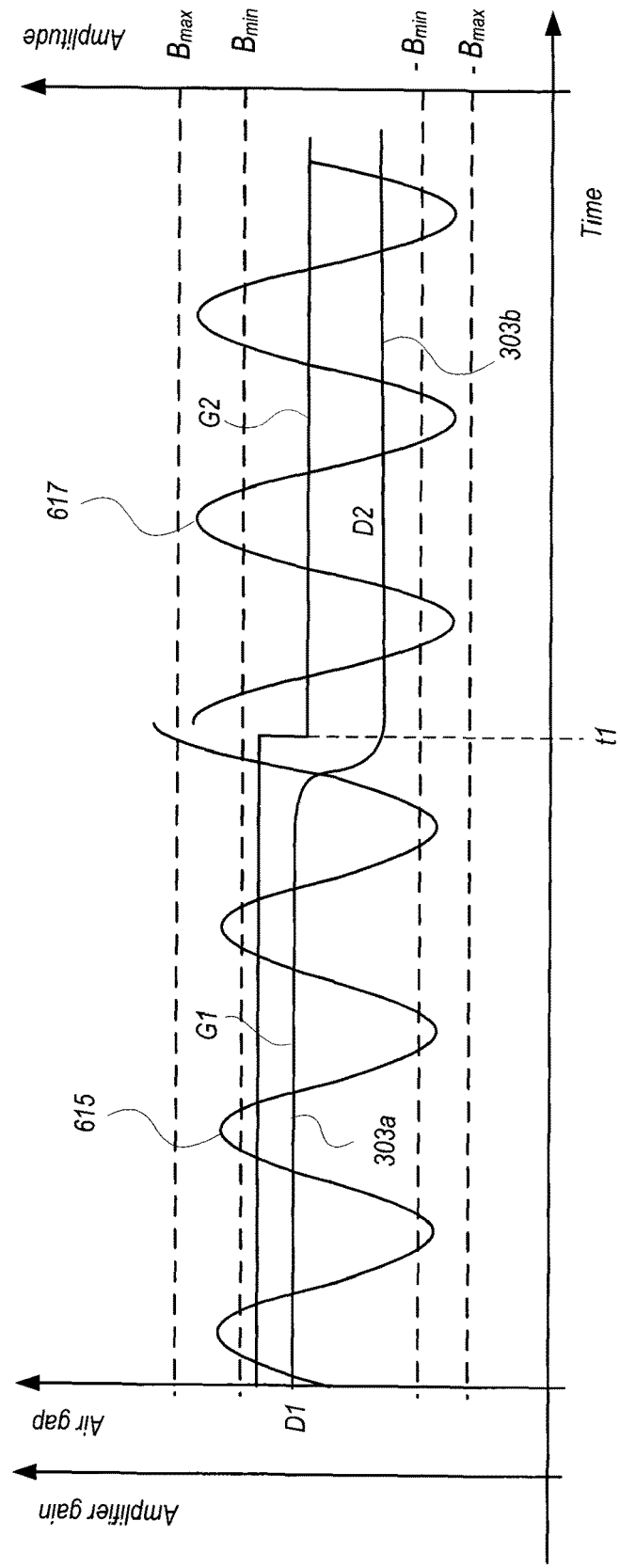
FIG. 6B illustrates a sample operation performed by a DSP and an AGC on a magnetic signal according to an embodiment of the present disclosure.

FIG. 6B illustrates a sample operation performed by a DSP and an AGC on a magnetic signal according to an embodiment of the present disclosure. The single-channel DSP 450 reads a magnetic signal 615 having an amplitude B1, which is within the $B_{min}$ to $B_{max}$ amplitude range, until time t1. The single-channel AGC 460 maintains the amplifier gain at G1. At time t1, the amplitude B1 increases to amplitude B2, which is greater than the maximum threshold $B_{max}$. As such the single-channel DSP 450 reduces the amplifier gain to G2, which attenuates the magnetic signal 615 from amplitude B2 to amplitude B3 to generate a magnetic signal 617. The amplitude B3 is within the $B_{min}$ to $B_{max}$ amplitude range The amplifier gain state is related to the air gap, as discussed with respect to FIG. 5. An amount of air gap can be determined using the amplifier gain state. For instance, for amplifier gain G1, the air gap can be D1; while for amplifier gain G2, the air gap can be D2. The air gap D2 is less than the air gap D1, which indicates that a decrease in air gap caused the magnetic signal amplitude to increase from B1 to B2.

Figure 7A:
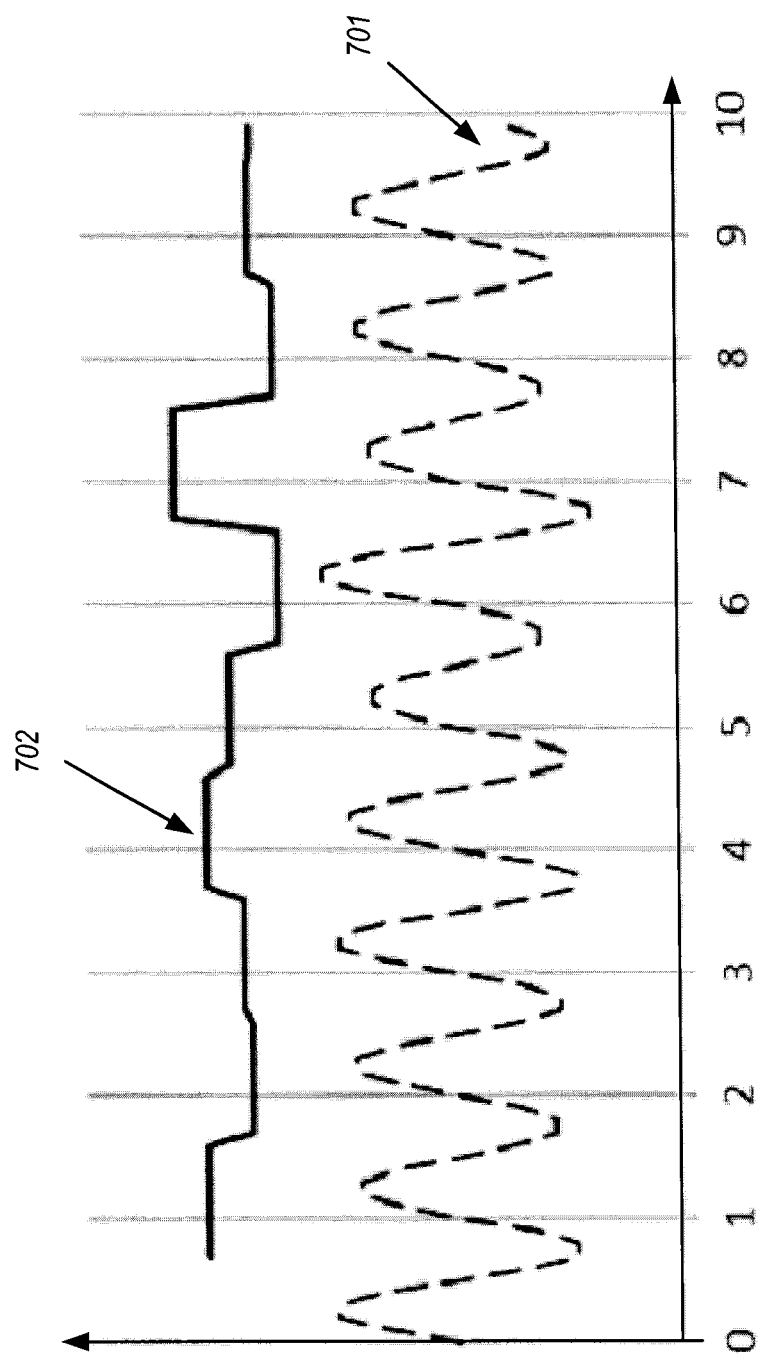
FIG. 7A illustrates a sample DIFF signal and a DIFF amplitude according to an embodiment of the present disclosure.
Figure 7B:
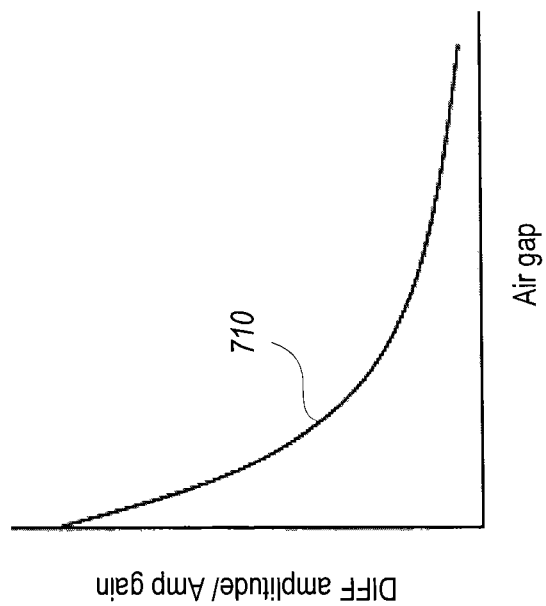
FIG. 7B illustrates a sample relationship between the DIFF amplitude and the air gap according to an embodiment of the present disclosure.

In another embodiment, the single-channel AGC 460 can analyze and determine the air gap based on a DIFF amplitude of the differential magnetic signal (referred as DIFF signal hereafter). The DIFF signal can be measured by the single channel differential magnetic sensing element to determine the air gap. FIG. 7A illustrates a sample DIFF signal and a DIFF amplitude. The graph indicates that a DIFF signal 701 has varying amplitude over a period of time, and the corresponding DIFF amplitude 702. The DIFF amplitude 702 based air gap determination provides a faster data rate compared to the AGC gain based approach. Further, the air gap resolution is not limited by the number of AGC gain states.

7B illustrates a sample relationship between the DIFF amplitude and the air gap. The single-channel DSP 450 determines and stores the DIFF amplitude for each period of the DIFF signal. Further, the DIFF amplitude data is normalized by dividing the amplitude gain G1 of the single-channel DSP 450 for each time period. A normalized DIFF amplitude 710 is equivalent to the magnetic field strength that can be mapped to the air gap. The 710 to air gap relationship can be established and validated using an experimental setup including a rotational sensor test fixture with adjustable air gap. The advantage of this approach can be faster air gap calculation rate since AGC steps are less frequent than DIFF waveform periods.

Figure 8:
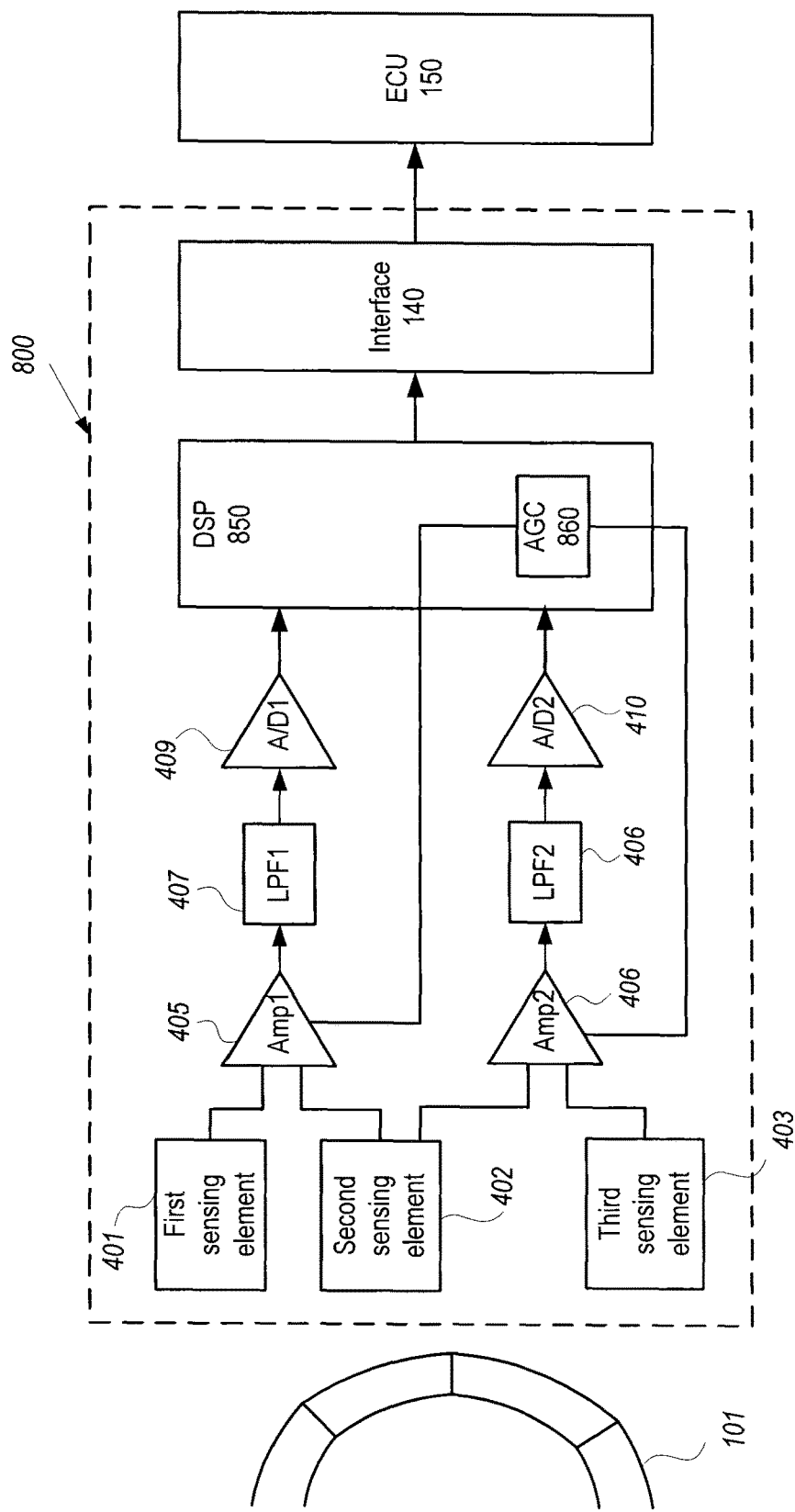
FIG. 8 illustrates a smart sensor employing a two-channel differential magnetic sense element according to an embodiment of the present disclosure.

FIG. 8 illustrates a smart sensor employing a two-channel differential magnetic sense element according to an embodiment of the present disclosure. A two-channel smart sensor 800 is an example of the smart sensor 100 (shown in FIG. 1). The two-channel smart sensor 800 employs two magnetic sensing elements, one amplifier, one low pass filter, and two A/Ds. The two-channel smart sensor 800 can be coupled to the rotating component 101 and the ECU 150. The two-channel smart sensor 800 includes a first sensing element 401, a second sensing element 402, a third sensing element 403, a first amplifier 405, a second amplifier 406, a first LPF 407, a second LPF 408, a first A/D 409, a second A/D 410, a two-channel DSP 850, a two-channel AGC 860, and an interface 140. In a first-channel (also referred as CH1 hereafter) the first sensing element 401 and the second sensing element 402 supply magnetic signal to the first amplifier 405, whose gain is controlled by the two-channel AGC 860. The amplified signal passes through the first LPF 407 to eliminate high frequency signal (as discussed earlier with respect to FIG. 4). Further, the first A/D 409 converts the magnetic signal to a digital form and sends the digital signal to two-channel DSP 850 and two-channel AGC 860 for further signal processing. Similarly, in a second-channel (also referred as CH2 hereafter) the second sensing element 402 and the third sensing element 403 supply magnetic signal to the second amplifier 406, whose gain is controlled by the two-channel AGC 860. The amplified signal passes through the second LPF 408 to eliminate high frequency signal. Further, the second A/D 410 converts the magnetic signal to a digital form and sends the digital signal to the two-channel DSP 850 and the two-channel AGC 860 for further signal processing. For instance, an air gap can be calculated for each of the first-channel and the second-channel independently, similar to air gap calculated for the single-channel smart sensor 400.

The second-channel signal is time delayed with respect to the first-channel. The time delay can be proportional to a sense element pitch. A sense element pitch can be defined as the distance between the sense elements of the first-channel and the second-channel. As the sense element pitch increase, the time delay increases. The two-channel configuration allows for calculation of the magnitude of an air-gap-change from time t1 to time t2. The air-gap-change data eliminates the effect of magnetic pole strength variation on the magnet rotor since each pole is compared to itself by a separate channel with known gain.

Figure 9:
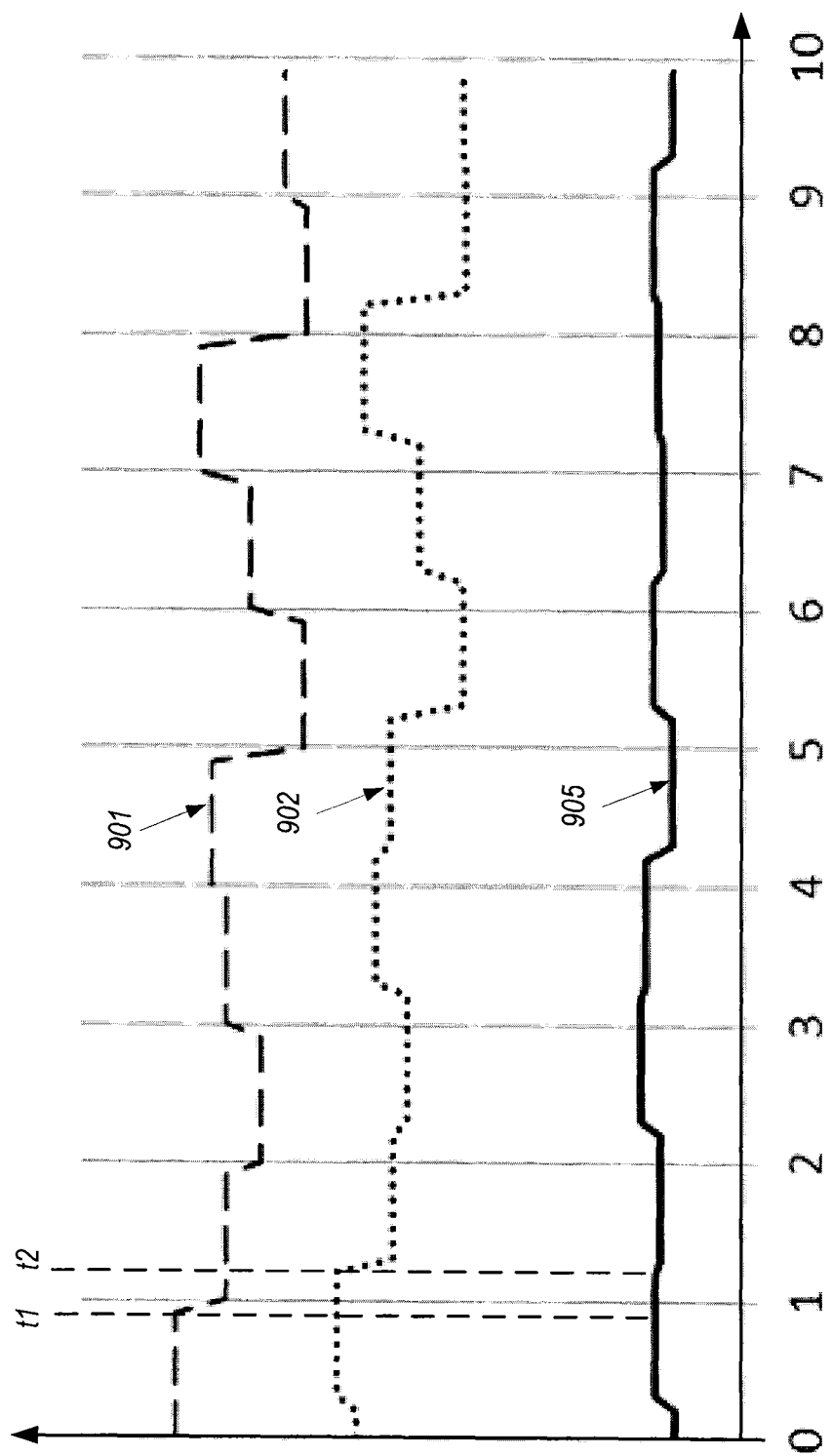
FIG. 9 is a sample two-channel air gap data collected over a period of time according to an embodiment of the present disclosure.

FIG. 9 is a sample two-channel air gap data collected over a period of time according to an embodiment of the present disclosure. The first-channel air gap data is represented as CH1 air gap 901 and the second-channel air gap data is represented as CH2 air gap 902. The CH2 air gap 902 data is delayed with respect to the CH1 air gap 901 data. For instance, in the CH1 air gap 901 the air gap changes at time t1; while in the CH2 air gap 902, the air gap change is observed at time t2. The difference between the CH1 air gap 901 and the CH2 air gap 902 can be represented as air-gap-change 905. The CH1 air gap 901, the CH2 air gap 902 and the air-gap-change 905 can be stored in a memory and used for processing by the two-channel DSP 850 (in FIG. 8). The detailed processing the CH1 air gap 901, the CH2 air gap 902 and the air-gap-change 905 is discussed with FIGS. 10-13.

Figure 10:
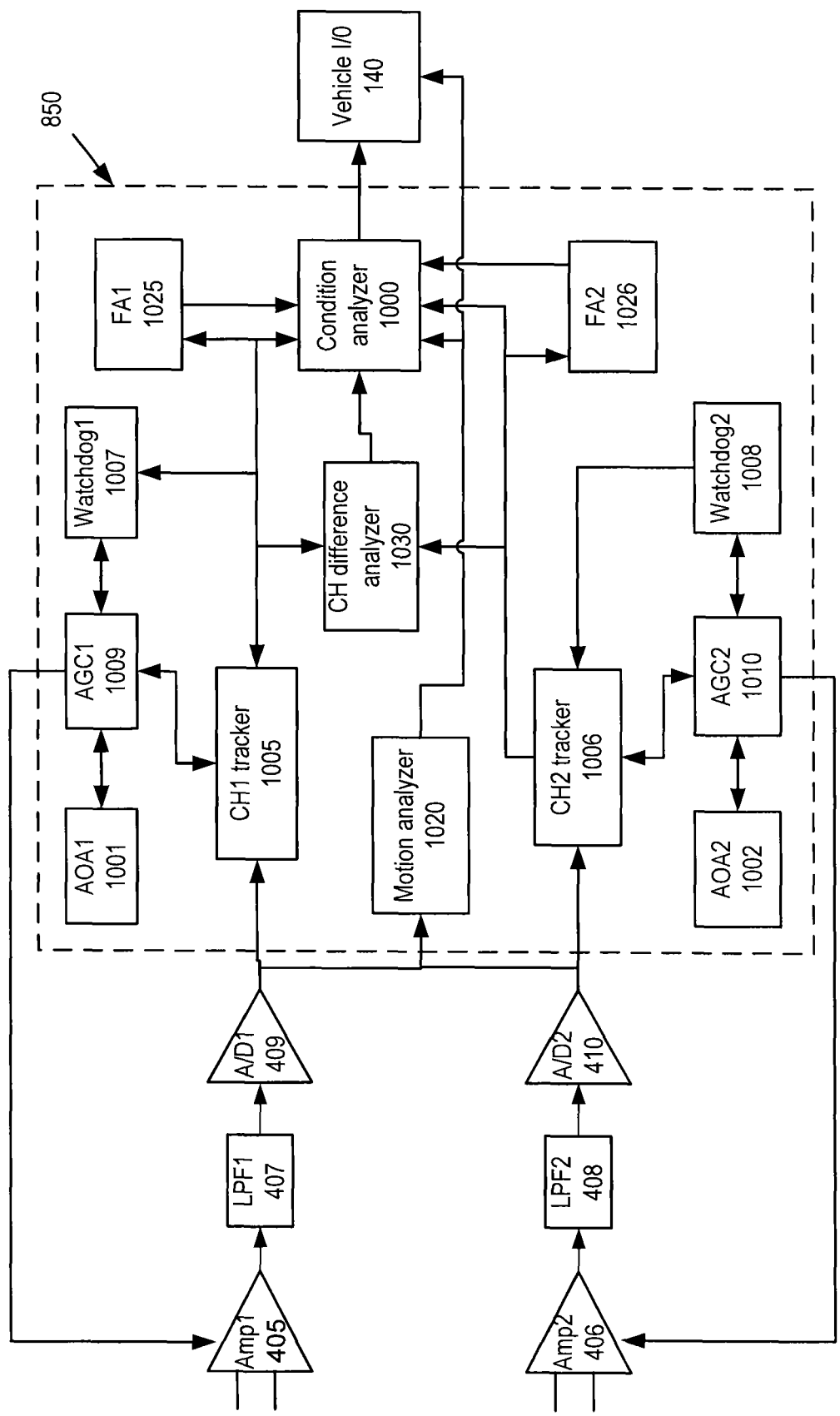
FIG. 10 is a block diagram of a sample DSP circuitry for a two-channel smart sensor according to an embodiment of the present disclosure.

FIG. 10 is a block diagram of a sample DSP circuitry for a two-channel smart sensor according to an embodiment of the present disclosure. The two-channel DSP 850 includes a motion analyzer 1020, which measures a wheel speed and determines the direction of rotation of the wheel; a CH difference analyzer 1030, which determines the difference between the signal received from the first channel and the second-channel; and a condition analyzer 1000, which analyzes the wheel speed, vehicle condition, and road condition.

The motion analyzer 1020 receives inputs from the first A/D 409 of first-channel and the second A/D 410 of the second-channel. Based on the inputs, the motion analyzer 1020 can calculate the wheel speed and the direction of the rotation of the wheel. For instance, when a magnetic sensor is employed, the wheel speed impacts the magnetic field. The changing magnetic field induces current in the coil of the magnetic sensor that is proportional to the wheel speed. Further, the rate of change of the wheel speed can be used to determine the acceleration of the wheel. Furthermore, the direction of rotation can be determined based on the time delay between the CH1 and the CH2 signals. For instance, if the CH2 signal is delayed, then the rotation can be in clockwise direction. On the other hand, if the CH1 signal is delayed, then the rotation can be in anti-clockwise direction. In another embodiment, input from the CH1 or the CH2 can be sufficient to determine the speed and the direction of rotation. For instance, CH1 employs a two sensing element, which produces a phase difference between the two signals. This phase difference between the two signals can be converted into wheel speed. Furthermore, the phase difference changes polarity when the direction of rotation changes. The change in polarity can be used to detect the direction of rotation. The motion analyzer 1020 can send the wheel speed and direction information to the condition analyzer 1000 and the interface 140 for further analysis.

The two-channel DSP 850 can include two automatic offset adjustment circuitry (AOA hereafter)—an AOA1 1001 and an AOA2 1002, two offset trackers—a CH1 tracer 1005 and a CH2 tracer 1006, and two watchdog timers—a watchdog1 1007 and a watchdog2 1008 corresponding to the first-channel (CH1) and the second-channel (CH2) respectively. The two-channel DSP 850 can be calibrated to determine the air gap from each of the signals from the CH1 tracer 1005 and the CH2 tracer 1006. Further, the air gap data can be stored in a memory and retrieved by two-channel DSP 850 on demand. The AOA, offset tracker, and watchdog timer are standard elements of a smart sensor, as such description of their functionality and operation are briefly discussed for reference. For instance, an AOA processing circuitry can automatically compensate for user induced offsets such as chip, magnet, or installation offsets. The AOA circuitry is continuously active including during a calibration mode, which occurs when a smart sensor is powered-on and a running mode, which follows the calibration mode. Furthermore, continuous operation of AOA allows the smart sensor to compensate for offset drift and offsets induced by temperature variations over time. The offset tracer keeps track of the peak of a signal, as well as a positive or a negative peak. The watchdog timer keeps track of time at which a signal is sent/received and can be reset as needed.

The two AGC namely the AGC1 1010 and the AGC2 1010 can control amplifier gains G1 and G2 respectively, similar to the single-channel AGC 460 discussed with respect to FIG. 4. The AOA, the AGC, the offset tracker, and the watchdog timers work together to eliminate any offsets in an input signal and provide a corrected amplified output signal that is free of offsets and variations caused by unrelated factors such temperature, misalignment or user-induced offsets. The CH1 tracer 1005 and the CH2 tracer 1006 send information, including the signal amplitude and the signal frequency, for further processing by the CH difference analyzer 1030, the condition judgement condition analyzer 1000, and the frequency analyzers—FA1 1025 and FA2 1026 respectively.

The CH difference analyzer 1030 can calculate difference in amplitude of signals from CH1 and CH2, the time delay between signals from CH2 and CH2, and the corresponding air gap change. The CH difference analyzer 1030 can send the output to the condition analyzer 1000 for further analysis, which is discussed in detail with respect to FIGS. 11-21B.

The frequency analyzers—FA1 1025 and FA2 1026 perform frequency analysis of the signal processed by the CH1 tracer 1005 and the CH2 tracer 1006 respectively. The frequency analysis can be performed using a Fast Fourier Transform (fft) approach or Discrete Fourier Transform (dft) approach. The frequency analysis data can be used to differentiate between different cases that may appear identical in air gap data analysis. Identical air gap can appear for different conditions such as normal road and vehicle condition, low tire pressure, suspension wear, and bumpy road. For instance, it may not possible to differentiate a tire with low air pressure from a smooth road with the air gap data alone.

Figure 15:
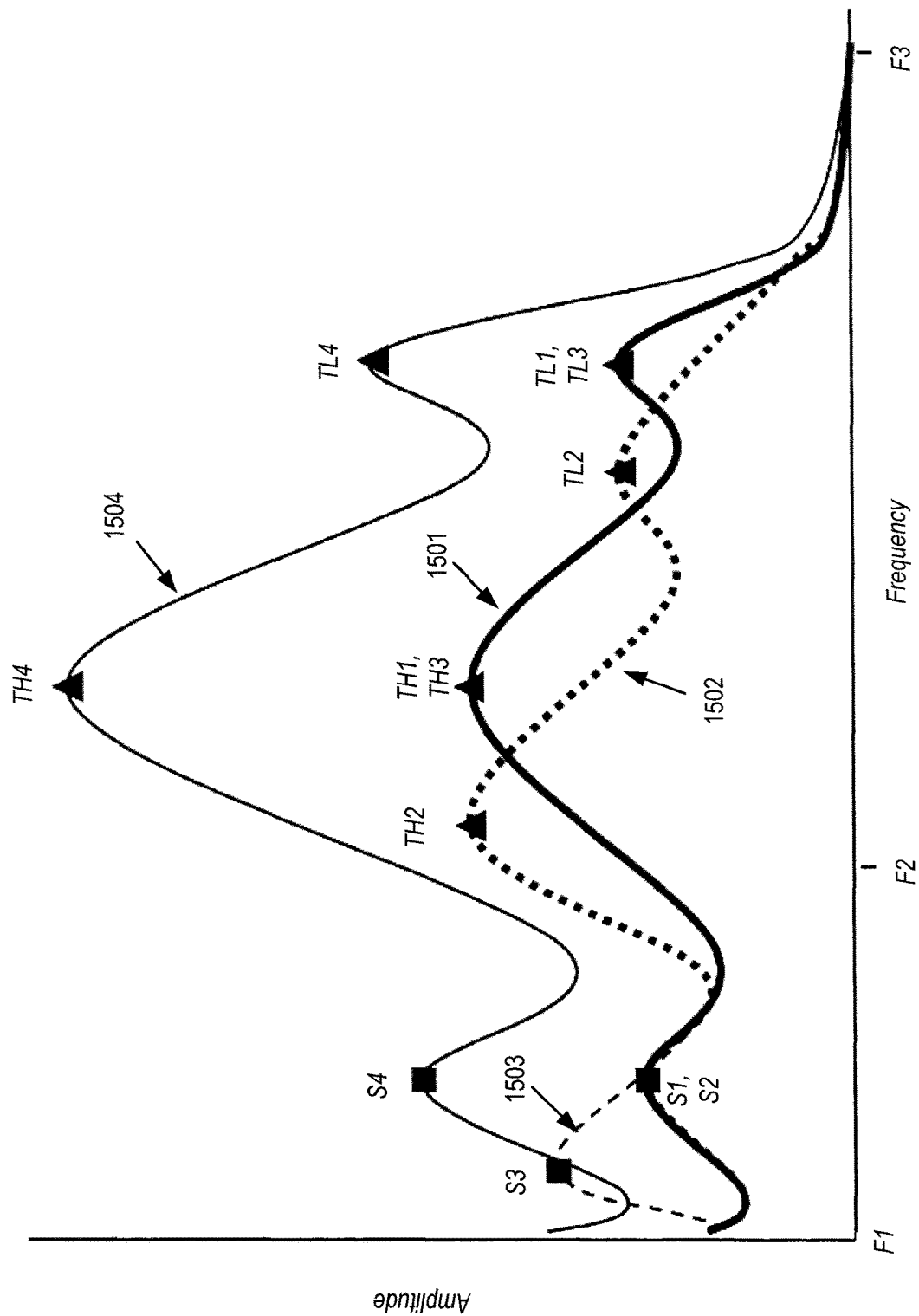
FIG. 15 illustrates a sample frequency spectrum used to support the frequency analysis according to an embodiment of the present disclosure.

FIG. 15 illustrates a sample frequency spectrum for supporting the frequency analysis according to an embodiment of the present disclosure. The frequency curve for different conditions can be different. For instance, for normal condition the frequency curve can look like a normal condition profile 1501; for low tire pressure condition the frequency curve can look like a low tire pressure profile 1502; for suspension wear condition the frequency curve can look like a suspension wear profile 1503; and for bumpy road condition the frequency curve can look like a bumpy road profile 1504. Furthermore, some of the curves may partly (or entirely) overlap with other conditions, for instance, the low tire pressure profile 1502 partly overlaps with the suspension wear profile 1503.

The frequency spectrum can be categorized into different frequency regions, each corresponding to a particular vehicle component. For instance, frequencies from F1 to F2 are specific to a suspension of the vehicle, while frequencies from F2 to F3 are specific to a tire of the vehicle. Furthermore, each frequency region can correspond to an amplitude peak which can indicate problems related to a particular component. For instance, the peaks S1, S2, S3, and S4 observed in the frequency region F1 to F2 relate to the suspension behavior under the normal condition profile 1501, the low tire pressure profile 1502, the suspension wear profile 1503, and the bumpy road profile 1504 respectively. The peaks TH1, TH2, TH3, and TH4 can be observed for the tire behavior when the tire pressure is high and the tire is subject to the normal condition profile 1501, the low tire pressure profile 1502, the suspension wear profile 1503, and the bumpy road profile 1504 respectively, within the frequency region F2 to F3 (and closer to F2). Similarly, the peaks TL1, TL2, TL3, and TL4 can be observed within the frequency region F2 to F3 (and closer to F3) for the tire behavior when the tire pressure is low.

Furthermore, observe that the amplitudes S3, TH1, TH2, and TH3 are approximately equal. As such condition analysis based on air gap data alone, which is related to the signal amplitude, can be insufficient. Air gap data analysis combined with frequency analysis can determine vehicle component conditions as well as road conditions. For instance, the amplitude peak S3 within the frequency region F1 to F2, not only indicates a bumpy road condition but also can indicate a soft suspension. Similarly, the amplitude peak TL2 and TL3 closer to frequency F3 indicates a low tire pressure along with a suspension wear. The frequency analysis data can be used for condition analysis performed in the condition analyzer 1000.

The condition analyzer 1000 determines the vehicle and road conditions based on data received from the tracers—CH1 tracers 1005 and CH2 tracer 1006, the CH difference analyzer 1030, the frequency analyzers—FA1 1025 and FA2 1026, and the motion analyzer 1020. The data from each analyzer can be used separately or in combination within the condition analyzer 1000. The condition analyzer 1000 implements different algorithms to determine the vehicle and road conditions. Sample algorithms are implemented and illustrated in FIG. 11 to FIG. 15.

Figure 11:
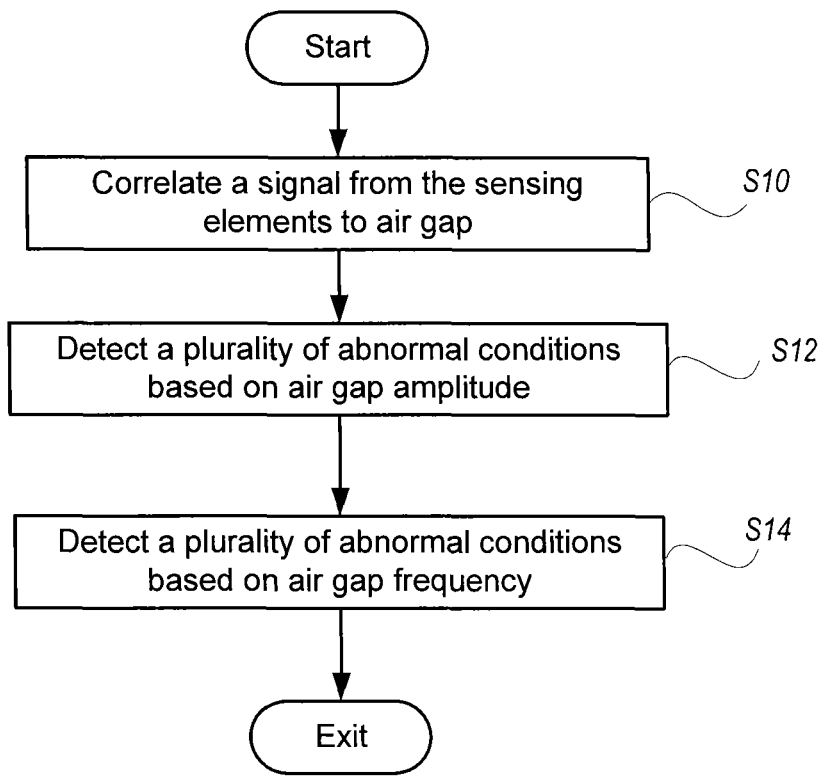
FIG. 11 is a flowchart of a sample process for determining abnormal vehicle or road condition based on air gap data according to an embodiment of the present disclosure.
Figure 20A:
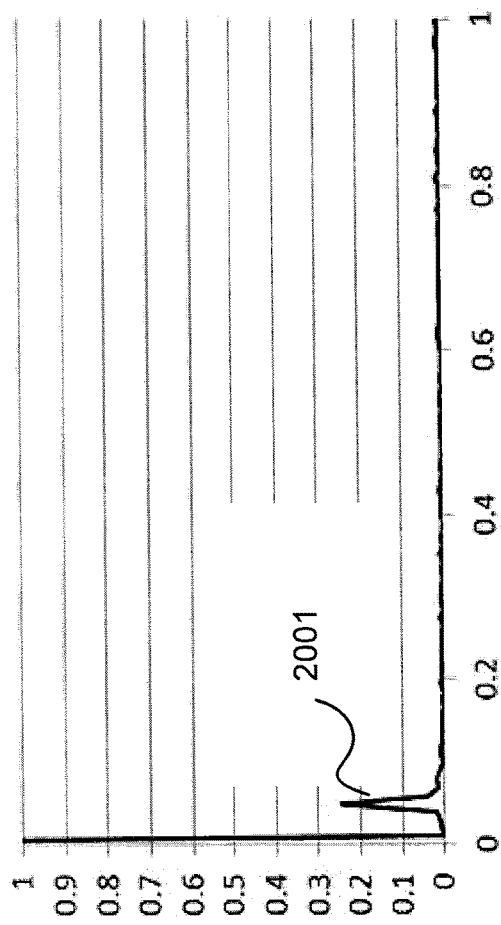
FIG. 20A illustrates the fast Fourier transform (fft) of the air gap signal according to an embodiment of the present disclosure.
Figure 20B:
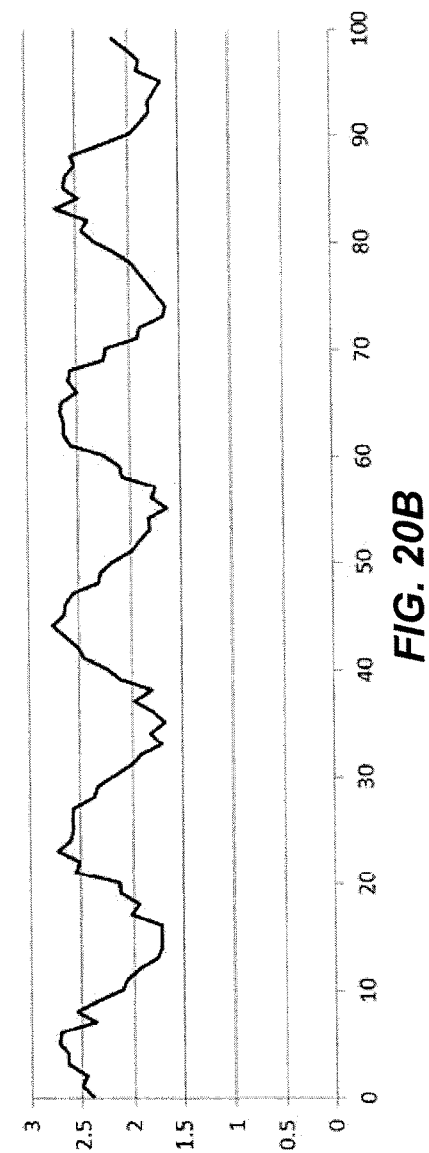
FIG. 20B is an exemplary air gap signal according to an embodiment of the present disclosure.

FIG. 11 is a flowchart of a sample algorithm for determining abnormal vehicle or road condition based on air gap data according to an embodiment of the present disclosure. The process starts when a magnetic signal is read from the sensing elements of the smart sensor 10. In step S10, the magnetic signal amplitude is correlated to an air gap. For example, correlating the amplitude gain or signal strength to the air gap, as discussed with respect to FIG. 5 and FIG. 7B. In step S12, abnormal conditions of the vehicle or a road are detected based on the air gap amplitude analysis. For example, as illustrated in FIGS. 17A-17C, FIGS. 18A-18C, and FIG. 18. In step S14, abnormal conditions of the vehicle or a road are detected based on the air gap frequency analysis. For example, as illustrated in FIG. 15 and FIG. 20A.

Figure 12:
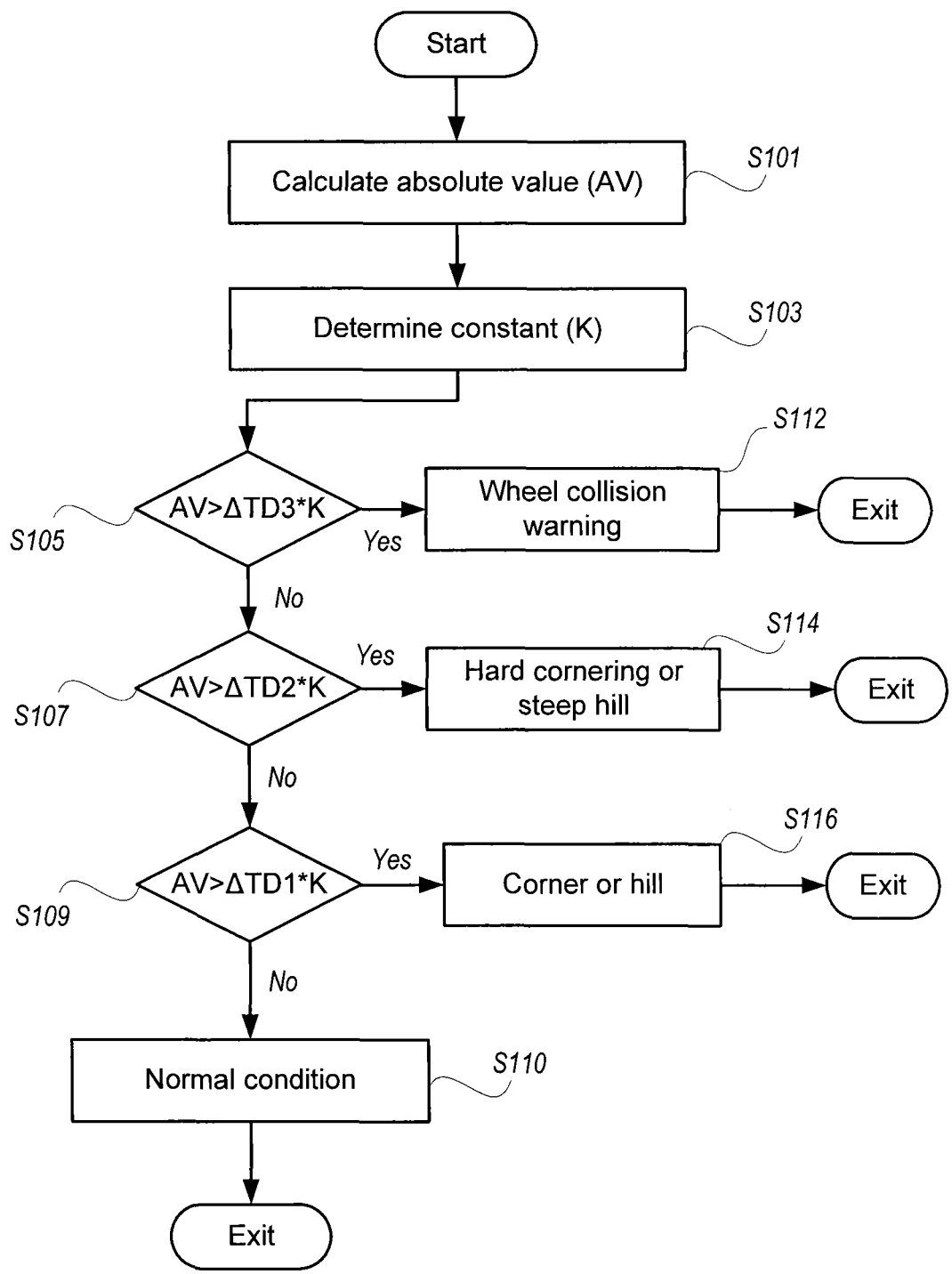
FIG. 12 is a flowchart of a sample algorithm for determining the wheel collision and vehicle cornering according to an embodiment of the present disclosure.

FIG. 12 is a flowchart of a sample algorithm for determining the wheel collision and vehicle cornering according to an embodiment of the present disclosure. The process starts when the condition analyzer 1000 receives data from the CH difference analyzer 1030, and the motion analyzer 1020. In step S101, an absolute value of data from CH difference analyzer 1030 is calculated. For instance, absolute value of difference in amplitude of the signal from CH1 and CH2. In step S103, a first constant (K) can be selected from a database based on the wheel speed data received from the motion analyzer 1020. The first constant (K) is related to a wheel speed and can be pre-determined by vehicle testing, experimentation or calibration process. Based on the wheel speed, the constant K can be used to increase or decrease a threshold limit corresponding to a vehicle condition or road condition. For instance, at high speeds, when a constant K is multiplied with a threshold, the threshold limit will increase, while at lower speeds the threshold limit will be lowered. The first constant (K) is multiplied with a second constant ΔTD to determine the condition of the vehicle or the road.

The second constant ΔTD can represent a threshold for air gap change corresponding to a vehicle condition or road condition and can be predetermined by vehicle testing, experimentation, or calibration process. The value of ΔTD or K can vary for different vehicles In step S105, a determination is made whether the absolute value (AV) calculated in step S101 is significantly equal to or greater than a product of the first constant (K) and one of the second constant i.e., ΔTD3*K. If not, a different check is performed in step S107. On the other hand, if the absolute value is less than the product ΔTD3*K, then a vehicle condition indicates a wheel collision and a warning can be issued, in step S112.

In step S107, a determination is made whether the absolute value (AV) is significantly equal to or greater than a product of the first constant (K) and one of the second constant (ΔTD2) i.e., ΔTD2*K. If not, a different check is performed in step S109. On the other hand, if the absolute value is less than the product ΔTD2*K, then a road condition can be assessed as a steep hill and the vehicle condition as hard cornering, in step S114.

In step S109, a determination is made whether the absolute value calculated in step S101 is significantly equal to or greater than a product of the first constant and one of the second constant (ΔTD1) i.e., ΔTD1*K. If not, the vehicle and road condition can be assessed as normal, in step S110. On the other hand, if the absolute value calculated in step S101 is less than the product ΔTD1*K, then a road condition can be assessed as a hill or the vehicle condition as cornering, in step S116.

The outputs such as the warnings, vehicle and road condition assessment from steps S112, S114, and S116 can be transmitted to the interface 140, which can further communicate with a user alert system to alert the driver of the vehicle. The user alert system can be implemented in the vehicle ECU 150. Furthermore, the condition data can be stored and retrieved in a memory as needed.

Figure 13:
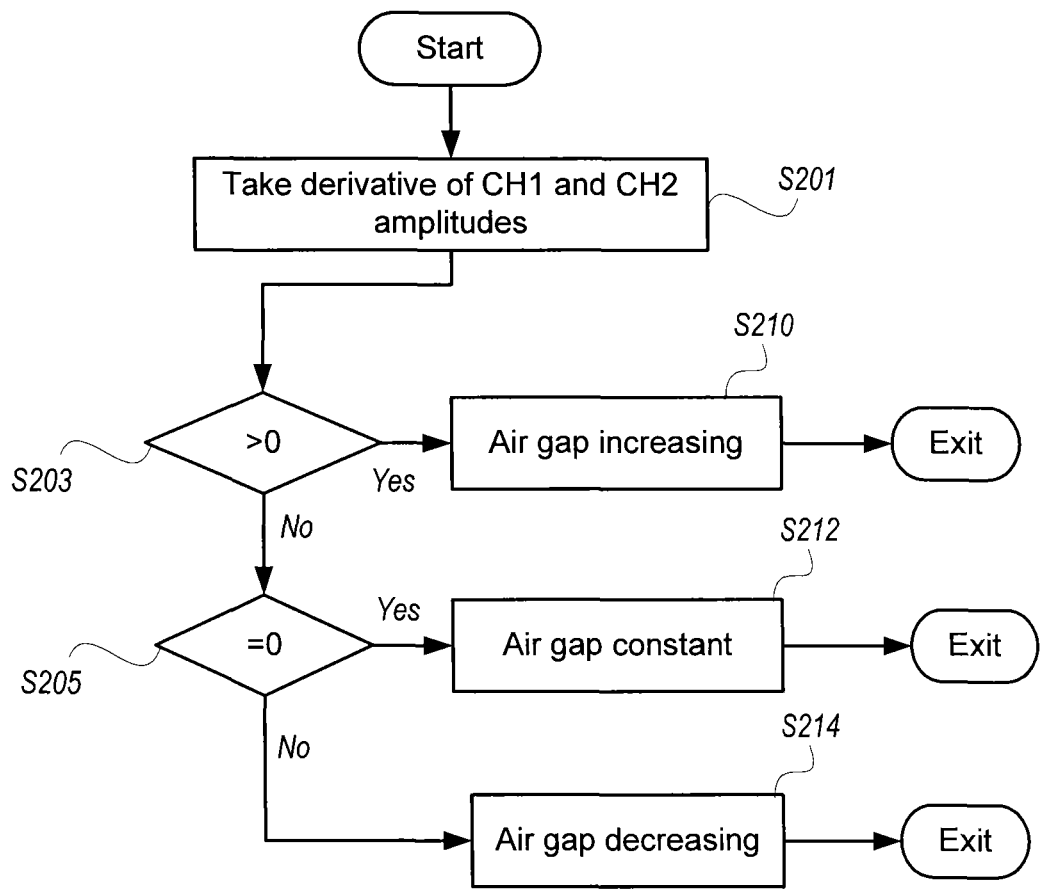
FIG. 13 is a flowchart of a sample algorithm for determining the air gap change according to an embodiment of the present disclosure.

FIG. 13 is a flowchart of a sample algorithm for determining the air gap change according to an embodiment of the present disclosure. The process starts when the condition analyzer 1000 receives data from the CH1 tracer 1005, and the CH2 tracer 1006. In step S201, a derivative of the CH1 and CH2 amplitudes is calculated. In step S203, a determination is made whether the derivative is greater than zero. If so, in step S210, an air gap indicator can be set to increasing. In step S205, a determination is made if the derivative of the CH1 and CH2 amplitudes is significantly equal to zero. If so, in step S212, an air gap indicator can be set to constant. If not, in step S214, an air gap indicator can be set to decreasing. The information from above process can be transmitted to the interface 140. Furthermore, the air gap data can be stored in and retrieved from a memory as needed.

Figure 14:
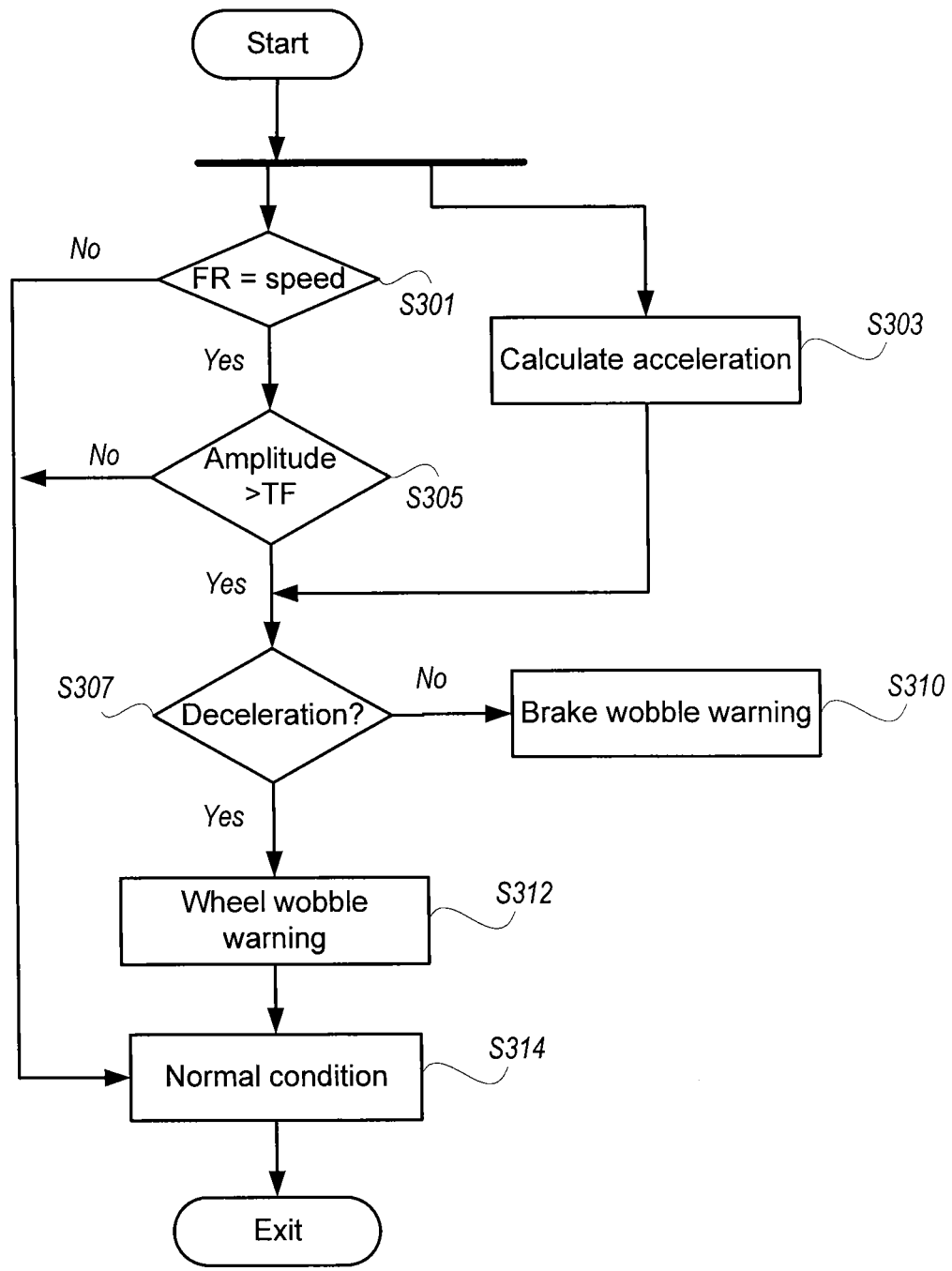
FIG. 14 is a flowchart of a sample algorithm for determining the brake and wheel condition according to an embodiment of the present disclosure.

FIG. 14 is a flowchart of a sample algorithm for determining the brake and wheel condition according to an embodiment of the present disclosure. The process starts when the condition analyzer 1000 receives data from the frequency analyzers—FA1 1025, and the FA2 1026, and the motion analyzer 1020. In step S301, the resonant frequency (FR) of the CH1 signal or the CH2 signal is compared to the wheel speed from the motion analyzer 1020. If they are significantly equal, then in step S305, the CH1 and CH2 amplitude is compared to a third constant TF. The third constant TF is a threshold for determining if the amplitude of a peak in a frequency analysis is large enough to trigger a wheel or brake wobble warning. The third constant can be set such that certain amount of wobble is acceptable thus prevent false warnings. Otherwise, the vehicle and road condition can be assessed as normal, in step S314.

In step S303, motion analyzer data such as wheel speed and direction is used to calculate the vehicle acceleration or deceleration. The step S303 can be performed before, after, or in parallel to the step S301.

In step S305, if the CH1 or CH2 amplitude is greater than the third constant TF, then step S307 is performed. In step 307, the wheel acceleration/deceleration information obtained from the motion analyzer 1020 is used to determine if the vehicle is decelerating. If the vehicle is decelerating, then the vehicle condition can be assessed as brake wobble, in step S310. On the other hand, if the vehicle is not decelerating, then the vehicle condition can be assessed as wheel wobble, in step S312.

Referring back to step S305, if the CH1 or CH2 amplitude is less than or significantly equal to the third constant TF, then the vehicle and road condition can be assessed as normal, in step S314. The information from above process can be transmitted to the interface 140. Furthermore, the air gap data can be stored in and retrieved from the memory as needed.

Figure 16B:
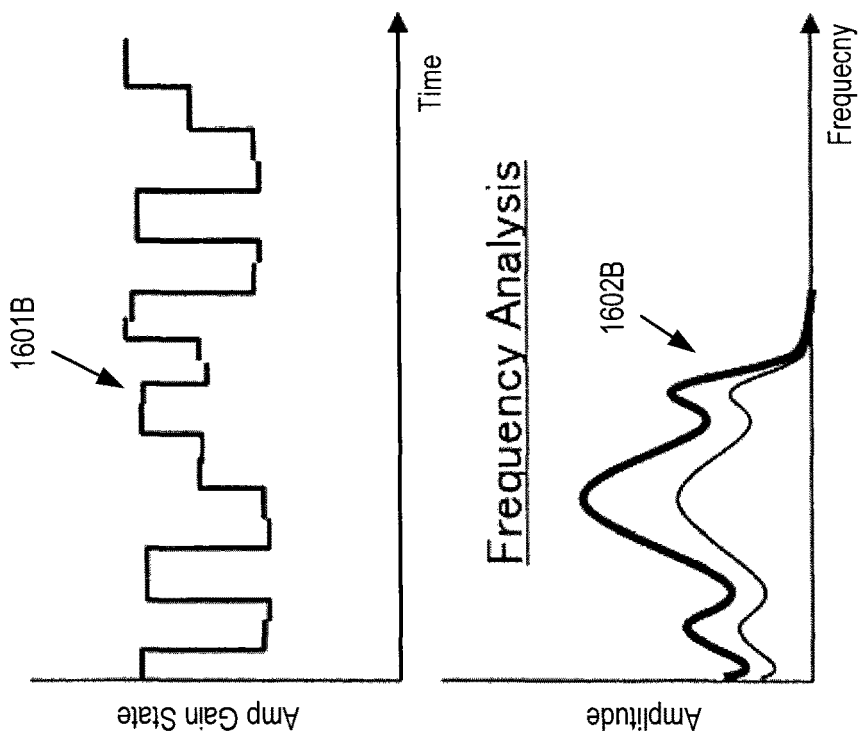
FIG. 16B illustrates an amplitude gain and frequency patterns for a gravelly road condition according to an embodiment of the present disclosure.
Figure 16A:
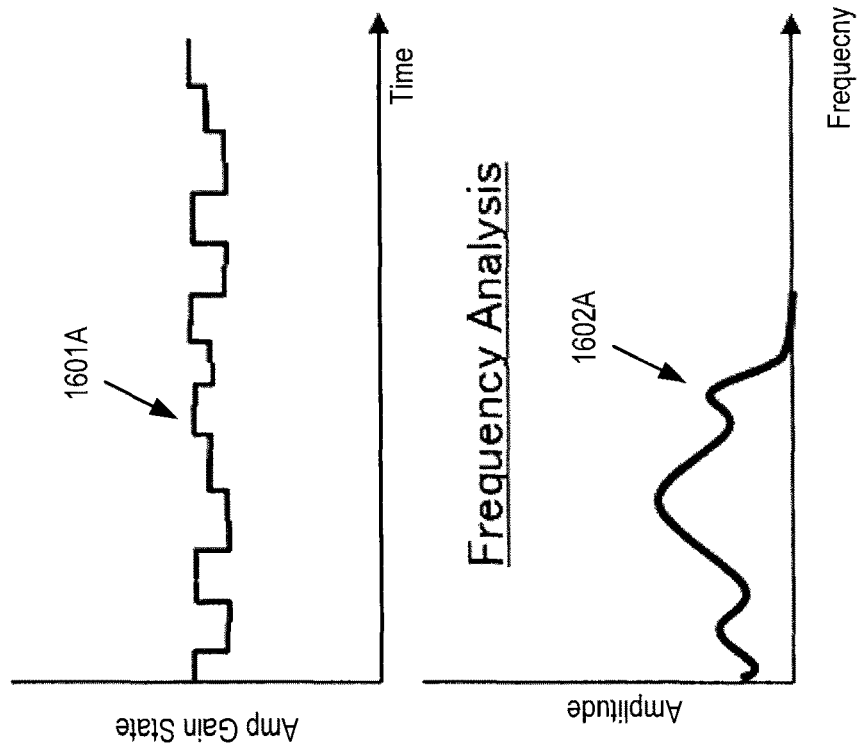
FIG. 16A illustrates an amplitude gain and frequency patterns for a dry pavement road condition according to an embodiment of the present disclosure.

FIGS. 16A-16F illustrate an amplitude gain and frequency patterns specific to different road conditions according to an embodiment of the present disclosure. These patterns can be predetermined experimentally and stored in the memory. The condition analyzer 1000 can access the stored patterns to determine the road condition. For instance, FIG. 16A illustrates a smart sensor output on a dry pavement. The amplitude gain state is irregular and a first gains 1601A are small and less frequent compared to gains observed in case of a gravelly road in FIG. 16B. The frequency analysis of the dry pavement can be represented by a first frequency curve 1602A. FIG. 16B illustrates a smart sensor output on a gravelly pavement. The amplitude gain state is irregular and a second gains 1601B are large and more frequent compared to gains observed in case of a dry and wet pavement road in FIGS. 16A and 16C respectively. The frequency analysis of the gravelly pavement can be represented by a second frequency curve 1602B, where the resonant frequency amplitudes are larger than the first frequency curve 1602A and a third frequency curve 1602C.

Figure 16D:
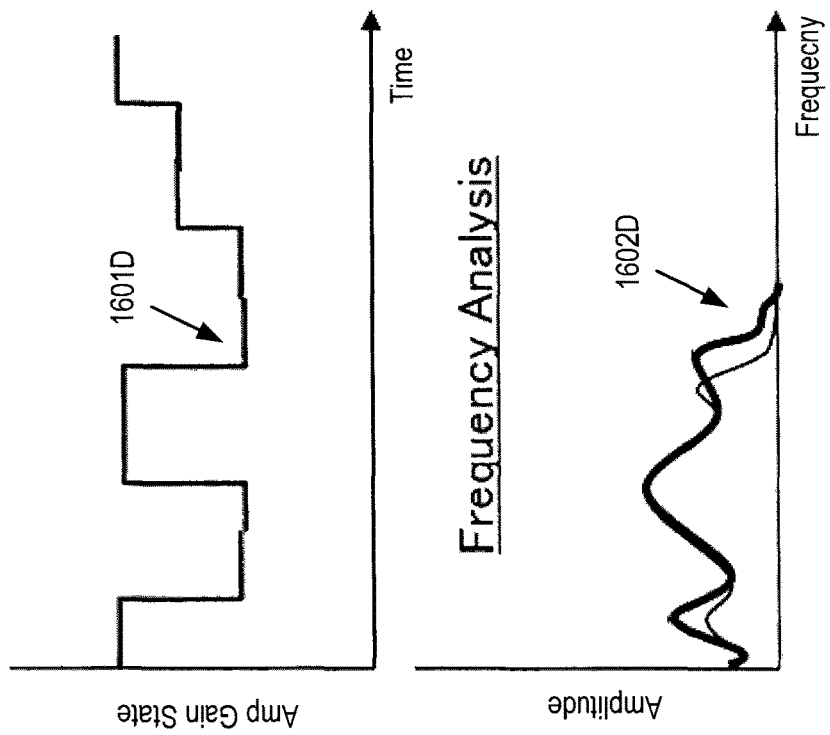
FIG. 16D illustrates an amplitude gain and frequency patterns for a snow or ice road condition according to an embodiment of the present disclosure.
Figure 16C:
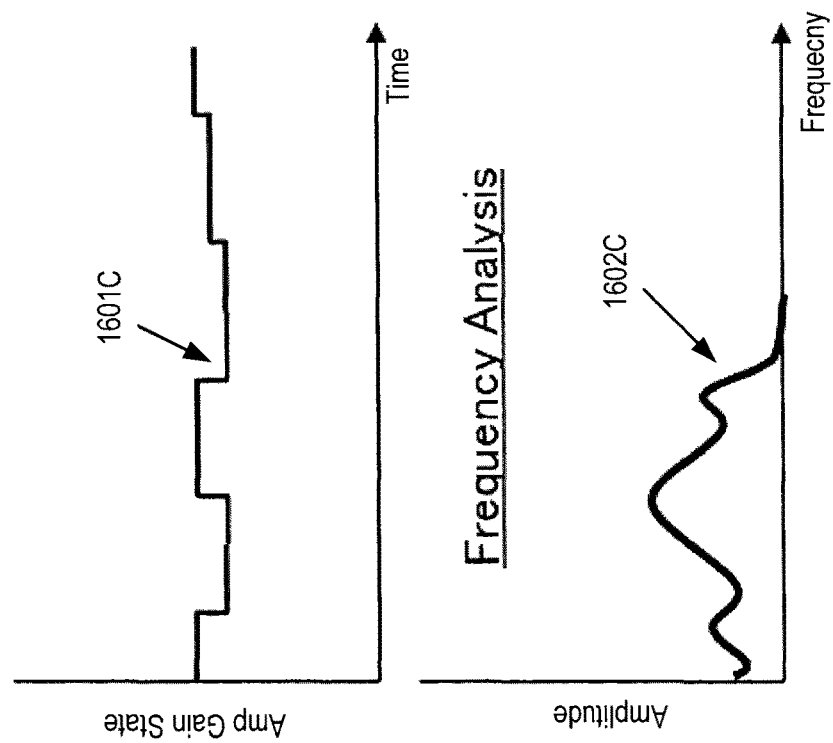
FIG. 16C illustrates an amplitude gain and frequency patterns for a wet pavement road condition according to an embodiment of the present disclosure.

FIG. 16C illustrates a smart sensor output on a wet pavement, a road having small bumps filled with water. The amplitude gain state is irregular and a third gains 1601C are small and less frequent compared to gains observed in case of a dry and gravelly road in FIGS. 16A and 16B respectively. The frequency analysis of the wet pavement can be represented by the third frequency curve 1602C. FIG. 16D illustrates a smart sensor output on a snow or ice covered pavement. The amplitude gain state is irregular and a fourth gains 1601D are large, similar to the gravel road in FIG. 16B, but less frequent. The frequency analysis of the snow or ice covered pavement can be represented by a fourth frequency curve 1602D.

Figure 16F:
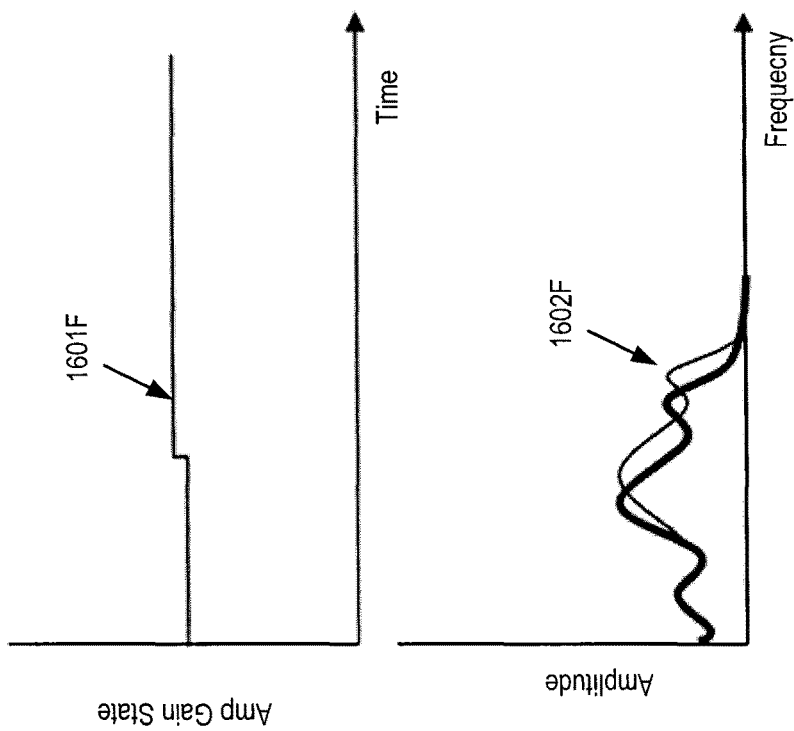
FIG. 16F illustrates an amplitude gain and frequency patterns for a low tire pressure road condition according to an embodiment of the present disclosure.
Figure 16E:
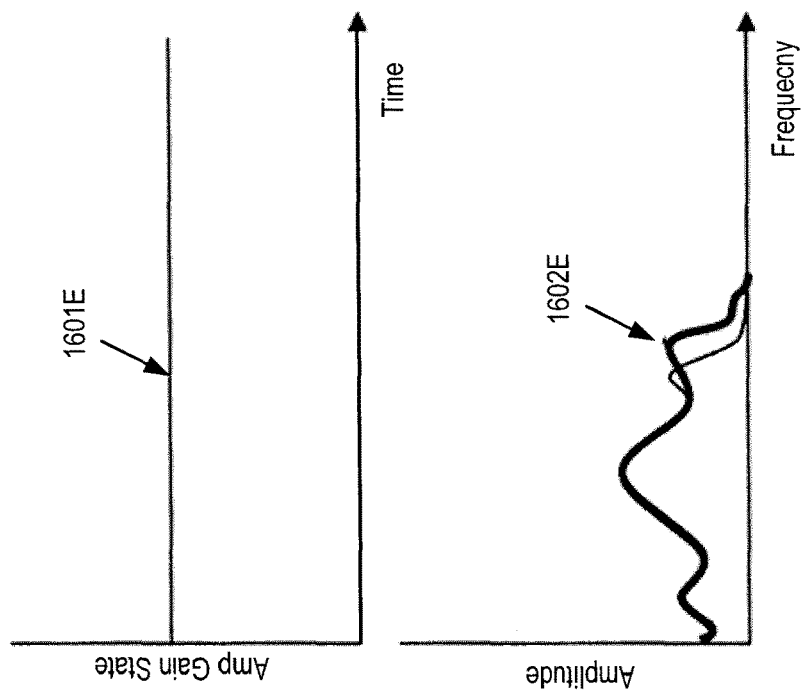
FIG. 16E illustrates an amplitude gain and frequency patterns for a black ice road condition according to an embodiment of the present disclosure.

FIG. 16E illustrates a smart sensor output on a pavement covered with black ice. The amplitude gain state is constant 1601E. The frequency analysis of the black ice pavement can be represented by a fifth frequency curve 1602E. FIG. 16F illustrates a smart sensor output on a low tire pressure condition. A sixth gains 1601F are small and less frequent since the tire absorbs small bumps in the road. The frequency analysis of the low tire pressure condition can be represented by a sixth frequency curve 1602F.

FIGS. 17A-17C illustrates two-channel air gap data during curb contact according to an embodiment of the present disclosure. In FIG. 17B, the left and the right wheels are coupled with two-channel smart sensors 800L and 800R respectively. Referring to an exemplary plot in FIG. 17A, the air gap data from the two-channel smart sensor 800L shows that a CH1 air gap 1701L and a CH2 air gap 1702L are time delayed with no significant peak in an air gap change 1703L plot. On the other hand, referring to FIG. 17C, the air gap data from the two-channel smart sensor 800R shows a part of a CH2 air gap 1702R is significantly different from a CH1 air gap 1701R between the period 3 to 5, while the remaining part of the CH2 air gap 1701R is time delayed with respect to the CH1 air gap 1701R. The significant change can be observed in the air gap change 1703R, which can be further used to trigger a curb contact warning signal.

An impact threshold corresponding to an air gap change can be defined to identify an anomaly in vehicle condition or road condition. The impact threshold can be specific to a particular condition such as a curb contact or a bumpy road, and can be defined by experimentation and vehicle testing. For instance an impact threshold 1705 indicates an air gap change limit for a curb contact condition. If the air gap change 1703R exceeds the impact threshold 1705, then a warning signal can be issued to alert a driver. For instance, the air gap change 1703R keeps rising between period 3 to 4 crossing the impact threshold 1705 and starts dropping between period 4-5 and remains below the impact threshold 1705 thereafter. When the air gap change 1703R first exceeds the impact threshold 1705 a warning can be issued. The warning signal can be deactivated when the air gap change 1703R falls below the impact threshold 1705.

Figure 18B:
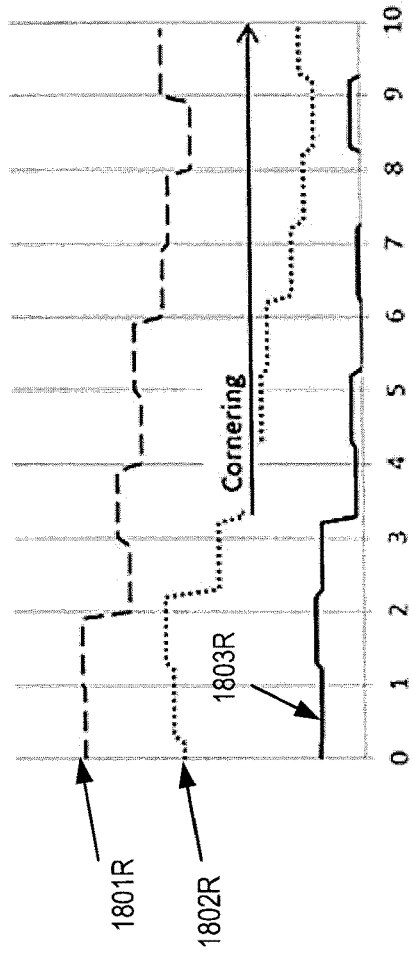
FIG. 18B is a sample configuration of two smart sensor coupled with a left wheel and a right wheel of the vehicle according to an embodiment of the present disclosure.
Figure 18C:
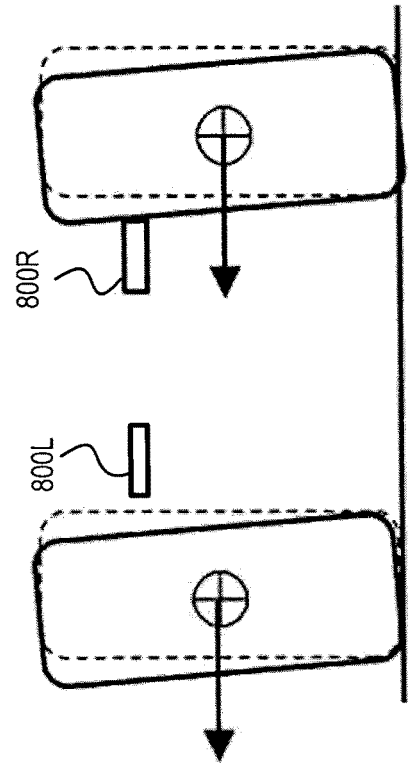
FIG. 18C illustrate an air gap change of a right wheel when a vehicle is cornering according to an embodiment of the present disclosure.
Figure 18A:
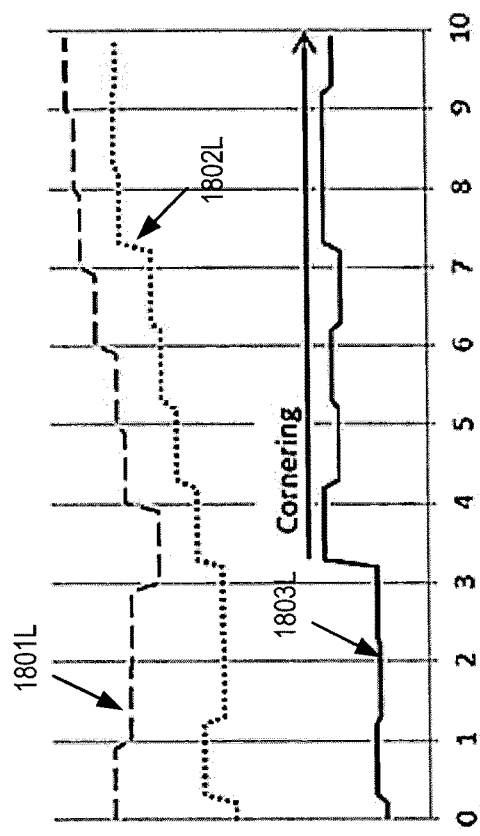
FIG. 18A illustrates an air gap change of a left wheel when a vehicle is cornering according to an embodiment of the present disclosure.

FIGS. 18A-18C illustrate an air gap change when a vehicle is cornering according to an embodiment of the present disclosure. In FIG. 18B, the left and the right wheels are coupled with a two-channel smart sensor 800L and a two-channel smart sensor 800R respectively. Referring to an exemplary plot in FIG. 18A, the air gap data from the two-channel smart sensor 800L shows that a CH1 air gap 1801L and a CH2 air gap 1802L are time delayed with a significant change in air gap. An air gap change 1803L indicates the vehicle starts cornering after period 3. Similarly, for the right wheel in FIG. 18C, the air gap data from the two-channel smart sensor 800R shows a significant change in the air gap change 1803R plot after period 3.

Furthermore, observe that the CH1 air gap 1801L (and CH2 air gap 1802L) is different from the CH1 air gap 1801R (and the CH2 air gap 1802R) since the air gap between the two-channel smart sensor 800L and the left wheel increases, while the air gap between the two-channel smart sensor 800R and the right wheel decreases. Furthermore, the air gap data can be correlated to cornering force via calibration process during the vehicle testing. As such, air gap data can be translated to a cornering force, which can be further used to determine the vehicle condition such as hard cornering or normal cornering.

Figure 19:
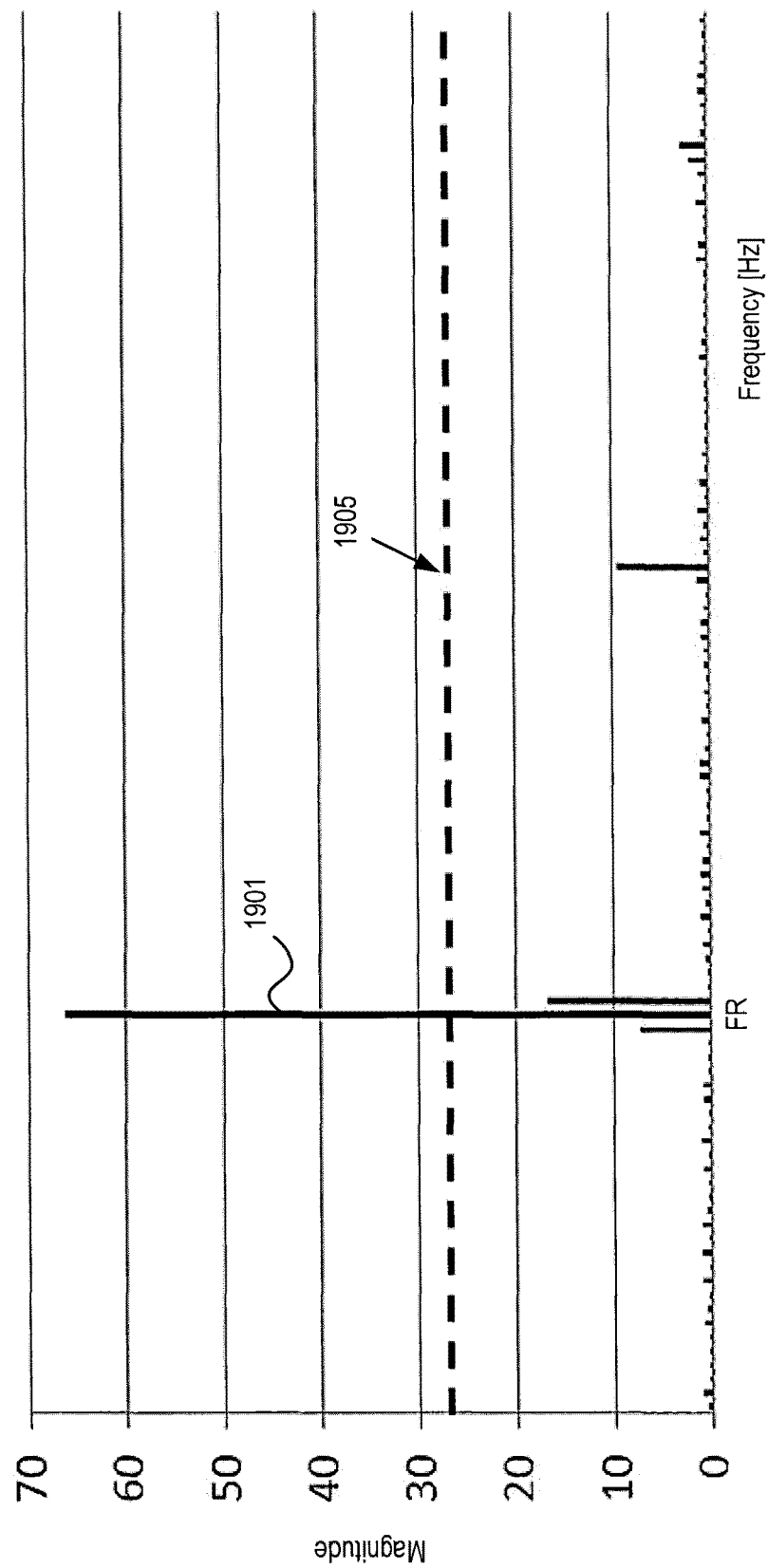
FIG. 19 illustrates a discrete Fourier transform (DFT) of air gap data during wheel or brake wobble according to an embodiment of the present disclosure.

FIG. 19 illustrates a discrete Fourier transform (DFT) of air gap data during wheel or brake wobble according to an embodiment of the present disclosure. The DFT can be performed by the frequency analyzers—FA1 1025 and FA2 1026 (in FIG. 10). The DFT of the air gap shows that at frequency FR, the resonant frequency is significantly equal to the wheel speed frequency. Further, a warning threshold 1905 can be set to trigger warning signals. The warning threshold 1905 can be predetermined by calibration process during vehicle testing. For example, when the resonant frequency magnitude 1901 exceeds the warning threshold 1905, a wobble condition can be detected. A wobble can be caused by several factors including unbalanced tire, a bent wheel, or a warped brake rotor.

Fast Fourier transform (fft) can be performed on any signal such as a DIFF signal, an air gap, etc. Certain condition can be detected using fft of the air gap, while other conditions can be detected using the fft of the DIFF signal. For example, fft of the air gap can be used to detect wobble, while fft of the DIFF signal does not detect wobble, as discussed with respect to FIGS. 20A and 20C.

Figure 20C:
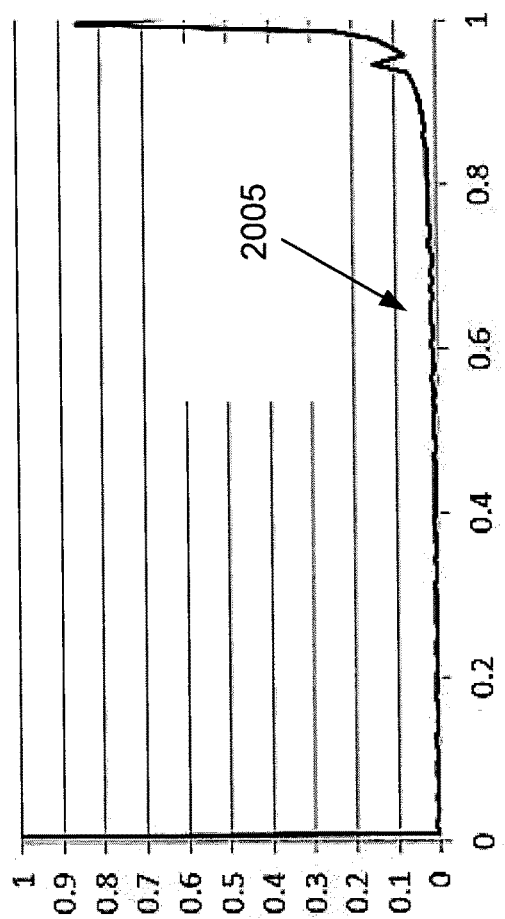
FIG. 20C illustrates the fast Fourier transform (fft) of the DIFF signal according to an embodiment of the present disclosure.
Figure 20D:
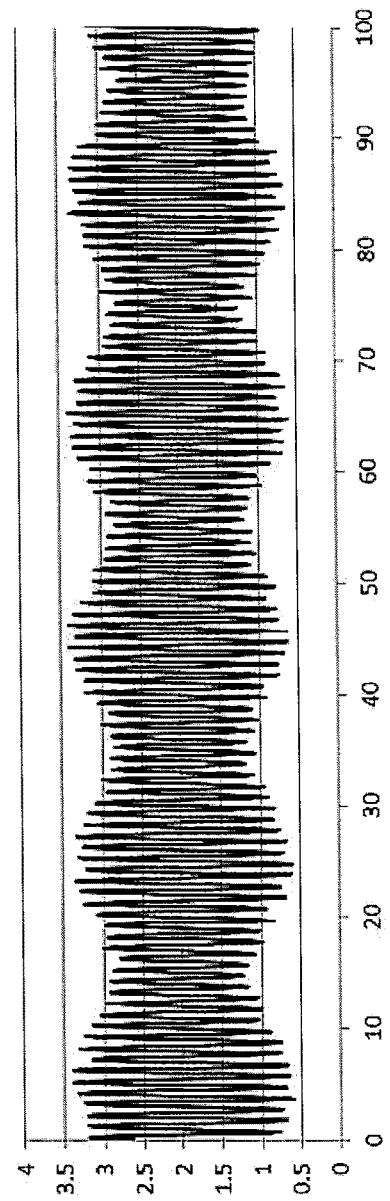
FIG. 20D is an exemplary DIFF signal according to an embodiment of the present disclosure.

FIG. 20A illustrates the fft of the air gap signal (shown in FIG. 20B) and FIG. 20C illustrates fft of the DIFF signal (shown in FIG. 20D) according to an embodiment of the present disclosure. In FIG. 20A a peak 2001 appears around frequency 0.1, which can be indicative of a wobble. On the other hand, fft of the DIFF signal 2005 does not have around frequency 0.1.

FIGS. 21A-21B are tables showing capabilities of a single-channel smart sensor and a two-channel smart sensor respectively, according to an embodiment of the present disclosure. The smart sensor can detect road conditions, tire conditions, wheel conditions, brake conditions, suspension conditions, dynamic conditions and other generic functions.

More particularly, the parameters detected are listed in column "parameters" in FIGS. 21A and 21B. The "parameters" can be detected by observing and analyzing variations in several smart sensor outputs such as a standard pulse output, an air gap based on AGC state, an air gap based on DIFF amplitude, an air gap change, and an air gap frequency analysis. The smart sensor may have one or more channels such as the single-channel or the two-channel as discussed earlier. Some "parameters" can be detected by both single-channel and the two-channel smart sensor. For example, wheel speed, a road roughness, a tire pressure, and a suspension damper condition. On the other hand some "parameters" can be detected only by the two-channel smart sensor. For example, a direction of tire rotation, a tire balance, a tire concentricity, a wheel wobble, a brake warp, a cornering force, and a collision. Further, the two-channel smart sensor has an added advantage of pole variation immunity compared to the single-channel smart sensor.

It should be noted that the list of "parameters" in the FIGS. 21A and 21B is not exhaustive and more parameters may be determined using the smart sensor configuration discussed in the present disclosure.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures. For example, this technology may be structured for cloud computing whereby a single function is shared and processed in collaboration among a plurality of apparatuses via a network.

What is claimed is:

1. A smart sensor for a vehicle, comprising:
   a rotating component coupled to a wheel of the vehicle, the rotating component having a plane of rotation;
   at least one magnetic sensing element installed on a suspension of the vehicle and separated by an air gap from the plane of rotation such that the air gap changes over time as the suspension flexes, the at least one magnetic sensing element outputting a signal corresponding to the air gap and the sensing element; and
   circuitry configured to
   receive the signal from the at least one magnetic sensing element,
   determine air gap data based on the signal,
   perform frequency analysis of the air gap data, and
   determine whether the vehicle has at least one of a wheel wobble and a brake wobble based on the air gap data and the frequency analysis of the air gap data.

2. The smart sensor for a vehicle according to claim 1, wherein the air gap data includes at least one of
   an amplitude of the signal from the at least one magnetic sensing element over a period of time, and
   a frequency of the signal from the at least one magnetic sensing element over a period of time.

3. The smart sensor for a vehicle according to claim 2, wherein
   the at least one magnetic sensing element is a differential hall effect sensor, and
   the amplitude over a period of time is a differential amplitude from the differential hall effect sensor.

4. The smart sensor for a vehicle according to claim 1, wherein the circuitry includes:
   at least one amplifier;
   at least one automatic gain controller configured to control a gain of the at least one amplifier;
   at least one automatic offset adjustment;
   at least one signal filter configured to filter out signals with high frequency; and
   at least one analog-to-digital converter.

5. The smart sensor for a vehicle according to claim 4, wherein the circuitry determines the air gap data from the gain of at least one amplifier.

6. The smart sensor for a vehicle according to claim 1, wherein the frequency analysis is a fast Fourier transform or a discrete Fourier transform of the air gap data.

7. The smart sensor for a vehicle according to claim 1, wherein the at least one magnetic sensing element is a two channel differential sensor with a first sensing element and a second sensing element.

8. The smart sensor for a vehicle according to claim 7, wherein a signal from the second sensing element is time delayed relative to a signal from the first sensing element.

9. The smart sensor for a vehicle according to claim 2, wherein the amplitude of the signal is inversely proportional to the air gap.

10. The smart sensor for a vehicle according to claim 1, wherein the air gap is a linear distance between the rotating component and the at least one magnetic sensing element.

* * * * *